United States Patent
Numata

(10) Patent No.: US 7,038,817 B2
(45) Date of Patent: May 2, 2006

(54) FACSIMILE SIGNAL TRANSMISSION SYSTEM

(75) Inventor: Yoshiaki Numata, Miyagi (JP)

(73) Assignee: NEC Communication System, (JP)

(*) Notice: Subject to any disclaimer, the term of this patent is extended or adjusted under 35 U.S.C. 154(b) by 916 days.

(21) Appl. No.: 09/885,688

(22) Filed: Jun. 20, 2001

(65) Prior Publication Data
US 2001/0053001 A1 Dec. 20, 2001

(30) Foreign Application Priority Data
Jun. 20, 2000 (JP) ............................ 2000-185500

(51) Int. Cl.
*H04J 15/00* (2006.01)
(52) U.S. Cl. ................. 358/425; 358/407; 358/426.16; 358/400; 358/405; 358/434; 358/437
(58) Field of Classification Search ................ 358/425, 358/407, 426.16, 400, 405, 434, 437
See application file for complete search history.

(56) References Cited

U.S. PATENT DOCUMENTS

| | | | | |
|---|---|---|---|---|
| 5,257,262 A | * | 10/1993 | Shioka et al. | 370/444 |
| 5,307,174 A | * | 4/1994 | Saito | 358/400 |
| 5,657,134 A | * | 8/1997 | Numata et al. | 358/425 |
| 6,044,147 A | * | 3/2000 | Hollier | 379/338 |
| 6,384,938 B1 | * | 5/2002 | Numata | 358/406 |
| 2003/0123466 A1 | * | 7/2003 | Somekh et al. | 370/401 |

FOREIGN PATENT DOCUMENTS

| | | |
|---|---|---|
| JP | 09-247414 | 9/1997 |
| JP | 11-243566 | 9/1999 |

OTHER PUBLICATIONS

Japanese Office Action issued Dec. 17, 2002 (w/ English translation of relevant portion).

* cited by examiner

*Primary Examiner*—Kimberly Williams
*Assistant Examiner*—Michael Burleson
(74) *Attorney, Agent, or Firm*—Dickstein, Shapiro, Morin & Oshinsky, LLP.

(57) ABSTRACT

Disclosed is a FAX signal transmission system, in which the transmission side and the reception side are inter-coupled by a bearer. Each side is constituted by DCME comprising a transmission side, which includes a signal identification circuit 3, a FAX data allotment control circuit 4, a delay circuit 9, a FAX data demodulation circuit 11, a FAX data allotment signal generation circuit 13 and a multiplexing circuit 14, and a reception side, which includes a FAX data distribution control circuit, a FAX data transmission circuit and a FAX data remodulation circuit. The transmission side is provided with a control terminal for inputting signal identification data. The input signal identification content of the signal identification circuit 3 can be changed according to the signal identification data.

12 Claims, 12 Drawing Sheets

US 7,038,817 B2

FACSIMILE SIGNAL TRANSMISSION SYSTEM

BACKGROUND OF THE INVENTION

This application claims benefit of Japanese Patent Application No. 2000-185500 filed on Jun. 20, 2000, the contents of which are incorporated by the reference.

The present invention relates to digital circuit multiplexing equipment (hereinafter referred to as DCME) and, more particularly, to facsimile signal transmission systems for the same, which are capable of updating the control of a signal identification (discrimination) circuit and also the demodulation control of a facsimile (hereinafter referred to as FAX) signal allotment (assignment) control circuit with respect to non-prescribed FAX protocols.

Among systems of FAX signal transmission via the DCME is a method of executing a DCME FAX signal compression and transmission process, which is prescribed in "FCH protocol", Section 6.2.2. in "Facsimile Demodulation/Redemodulation for Digital Multiplication Equipment", ITU-T Recommendation G.766.

The ITU-T Recommendation G.766 itself adopts as its basic protocol "Procedure for Document Facsimile Transmission in the General Switched Telephone Network", ITU-T Recommendation T.30, which prescribes inter-FAX protocol control.

FIG. 11 shows the construction of a prior art transmission side of DCME for executing the above basic protocol. As shown, this DCME transmission side has a general construction comprising a signal identification circuit 51, a delay circuit 52, a voice/data allotment control circuit 53, a voice/data ADPCM (Adaptive Differential Pulse Code Modulation) coding circuit 54, a voice/data transmission circuit 55, a voice/data allotment signal generation circuit 56, a delay circuit 57, a FAX data allotment control circuit 58, a FAX data demodulation circuit 59, a FAX data transmission circuit 60, a FAX allotment signal generation circuit 61 and a multiplexing circuit 62.

In the transmission side shown in FIG. 11, a trunk ("TRUNK") signal from a switching station side (not shown), is inputted via a trunk signal input terminal to the signal identification (discrimination) circuit 51. The signal identification circuit 51 outputs a voice/data identification signal when it identifies (discriminates) the input signal to be a voice signal or a data signal, and outputs a FAX data identification signal when it identifies the input signal to be a FAX data signal. According to the voice/data identification signal from the signal identification circuit 51, the voice/data allotment (assignment) control circuit 53 outputs a delay control signal to the to the delay circuit 52, outputs a voice/data ADPCM coding control command to the voice/data ADPCM coding circuit 54, outputs voice/data signal transmission command to the voice/data signal transmission circuit 55, and outputs a voice/data allotment command to the voice/data allotment signal generation circuit 56. In this way, the circuit 53 effects allotment control of the above pertinent circuits. The delay circuit 52 delays the input signal by a time necessary for the identification of the input signal, and outputs the resultant delayed voice/data signal to the voice/data ADPCM coding circuit 54. In the circuit 54, the pertinent ADPCM coding circuit selected according to the ADPCM coding control command from the voice/data allotment control circuit 53, executes an ADPCM coding process on the allotted (assigned) voice or data signal, and outputs the resultant voice/data ADPCM signal to the voice/data transmission circuit 55. The circuit 55 rearranges the input voice/data signal obtained by the ADPCM coding process, and transmits the resultant signal as voice/data transmission signal to the multiplexing circuit 62 for the multiplexing. The voice/data allotment signal generation circuit 56 generates a voice/data allotment signal, and transmits this signal to the multiplexing circuit 62 for the notification of voice/data allotment data to the opposite side of communication.

Likewise, according to the FAX data identification signal inputted from the signal identification circuit 51, the FAX data allotment control circuit 58 outputs a delay control signal to the delay circuit 57, outputs a FAX data demodulation control command to the FAX data demodulation circuit 59, outputs a FAX data transmission command to the FAX data transmission circuit 60, and outputs a FAX data allotment command to the FAX data allotment signal generation circuit 61. In this way, the circuit 58 effects allotment control of the above pertinent circuits. The delay circuit 57 delays the input signal by a time necessary for the identification, and outputs the resultant delayed FAX data signal to the FAX data modulation circuit 59. In the circuit 59, the pertinent FAX data demodulation circuit selected according to the FAX data demodulation control command, executes a FAX data demodulation process, and outputs the resultant FAX data demodulation signal to the FAX data transmission circuit 60. The FAX data transmission circuit 60 rearranges the input FAX data demodulation signal, and transmits this signal to the multiplexing circuit 62 for multiplexing. The FAX allotment signal generation circuit 61 generates and outputs a FAX allotment signal for the notification of FAX data allotment data to the opposite side of communication. The multiplexing circuit 62 multiplexes the voice/data transmission signal, the voice/data allotment signal, the FAX data transmission signal and the FAX data allotment signal, and transmits a resultant bearer as compression coded output signal to the opposite side of communication.

FIG. 12 shows the construction of a prior art reception side of DCME for executing the above basic protocol. As shown, this reception side has a general construction comprising a separating circuit 63, a voice/data signal output circuit 64, a voice/data allotment signal reception circuit 65, a voice/data distribution control circuit 66, a voice/data ADPCM demodulation circuit 67, a FAX data signal output circuit 68, a FAX allotment signal receiving circuit 69, a FAX distribution control circuit 70, a FAX signal remodulation circuit 71 and a signal output circuit 72.

In the reception side shown in FIG. 12, the multiplexed input bearer signal is inputted to the separating circuit 63. The separating circuit 63 separates voice/data transmission signal, voice/data allotment signal, FAX transmission signal and FAX allotment signal from the input bearer signal. The voice/data allotment signal reception circuit 65 performs analysis of the voice/data allotment signal to output a voice/data allotment analysis signal. The voice/data distribution control circuit 66 outputs a voice/data signal control command and a voice/data ADPCM decoding control signal according to the allotment analysis signal for distribution control of the voice/data signal output circuit 64 and the voice/data ADPCM decoding circuit 67, respectively. The voice data output circuit 64 rearranges the voice/data transmission signal according to the voice/data signal output control command, and outputs a resultant rearranged voice/data ADPCM decoded signal for an ADPCM decoding process. The voice/data ADPCM decoding circuit 67 performs an ADPCM decoding process on the pertinent signal in the voice/data ADPCM decoding signal according to the voice/data ADPCM decoding control signal, and outputs the resultant decoded voice or data signal to the signal output circuit 72.

The FAX allotment signal reception circuit 69 performs analysis of the FAX allotment signal separated in the separating circuit 63, and outputs a FAX allotment analysis signal. The FAX distribution control circuit 70 outputs a FAX data signal output control command and a FAX data signal remodulation control command according to the FAX allotment analysis signal for distribution control of the FAX data signal output circuit 68 and the FAX data signal remodulation circuit 71. The FAX data signal output circuit 68 rearranges the FAX data demodulation signal according to the FAX data signal output command, and outputs a resultant FAX demodulation signal for a FAX data signal remodulation process. The FAX data signal remodulation circuit 71 performs a remodulation process of the pertinent signal in the FAX demodulation signal according to the FAX data signal remodulation control command, thus generating a FAX remodulation signal.

The signal output circuit 72 outputs the demodulated voice signal, the decoded data signal and the remodulated FAX remodulation signal to respective trunks to be outputted via a trunk signal output terminal to a switching station (not shown).

The prior art DCME, however, has a problem that on the transmission side the FAX data signal discrimination control cannot be freely set.

This problem arises from the fact that the transmission side of the DCME does not have a function of freely setting a FAX data signal identification function. Therefore, the signal identification function of the FAX module for processing the FAX data signal, is such that processing is possible only with a fixed FAX protocol prescribed in ITU-T G.766. Therefore, when a non-prescribed FAX protocol is inputted or when ITU-T G.766 is updated, erroneous identification of a FAX data signal capable of being processed or demodulation control disability may arise, and in the extreme case it becomes necessary to execute an inter-FAX terminal cut-off process.

SUMMARY OF THE INVENTION

The present invention was made in view of the above background, and it has an object of providing a FAX data signal transmission system, which is capable of changing signal identification circuit control and changing FAX signal allotment control signal circuit demodulation control.

According to an aspect of the present invention, there is provided a facsimile signal transmission system, in which the transmission side and the reception side are inter-coupled via a bearer for bilateral facsimile signal transmission, each side being constituted by DCME comprising: a transmission side including a signal identification means for identifying the input signal and outputting a FAX data identification signal, a FAX data allotment control means for outputting allotment control data for a FAX data demodulation process according to the FAX data identification signal, a FAX data demodulation processing means for demodulating and rearranging the input signal according to the allotment control data and outputting a FAX data transmission signal, a FAX allotment data generation means for generating a FAX data allotment signal for notifying the allotment control data to the opposite side of communication, and a multiplexing means for multiplying the FAX data transmission signal and the FAX data allotment signal and outputting the resultant signal as a bearer signal; and a reception side including a separation means for separating the FAX data transmission signal and the FAX data allotment signal from the bearer input and outputting the separated signals, a FAX data allotment signal reception means for outputting a FAX data allotment analysis signal from the FAX data allotment signal, a FAX data distribution control means for outputting distribution control data for remodulation of FAX data, a FAX data remodulation processing means for remodulating the FAX data transmission signal according to the distribution control data and outputting a FAX data remodulation signal, a signal output means for outputting the FAX remodulation signal as trunk signal; wherein the transmission side is provided with a control terminal for inputting signal identification data, and the input signal identification content in the signal identification means is capable of being changed according to the signal identification data.

According to another aspect of the present invention, there is provided a facsimile signal transmission system, in which the transmission side and the reception side are inter-coupled via a bearer for bilateral facsimile signal transmission, each side being constituted by DCME comprising: a transmission side including a signal identification means for identifying the input signal and outputting a FAX data identification signal, a FAX data allotment control means for outputting allotment control data for a FAX data demodulation process according to the FAX data identification signal, a FAX data demodulation processing means for demodulating and rearranging the input signal according to the allotment control data and outputting a FAX data transmission signal, a FAX allotment data generation means for generating a FAX data allotment signal for notifying the allotment control data to the opposite side of communication, and a multiplexing means for multiplying the FAX data transmission signal and the FAX data allotment signal and outputting the resultant signal as a bearer signal; and a reception side including a separation means for separating the FAX data transmission signal and the FAX data allotment signal from the bearer input and outputting the separated signals, a FAX data allotment signal reception means for outputting a FAX data allotment analysis signal from the FAX data allotment signal, a FAX data distribution control means for outputting distribution control data for remodulation of FAX data, a FAX data remodulation processing means for remodulating the FAX data transmission signal according to the distribution control data and outputting a FAX data remodulation signal, a signal output means for outputting the FAX remodulation signal as trunk signal; wherein the transmission side is provided with a control terminal for inputting a FAX data demodulation control data, the demodulation control content outputted from the FAX data allotment control means to the FAX data demodulation processing means is changed according to the FAX data demodulation control signal, and the FAX data remodulation processing means in the reception side can execute a remodulation process corresponding to the changed demodulation content according to the FAX allotment signal from the FAX data allotment signal generation means.

The FAX data demodulation processing means includes a delay means for delaying the input signal for a time necessary for the signal identification in the signal identification means according to the allotment control data, a FAX data demodulation means for demodulating the FAX data signal with a pertinent demodulation circuit selected according to the allotment control data and outputting a FAX data demodulation signal, and a FAX data transmission means for rearranging the FAX data demodulation signal according to the allotment control data and outputting the FAX transmission signal. The FAX data remodulation processing means includes a FAX data transmission means for rearranging the FAX data transmission signal according to the distribution control data and outputting the FAX demodulation signal, and a FAX data remodulation means for remodulating the FAX data demodulation signal according to the distribution control data. The voice/data allotment data and the FAX data allotment data are transmitted mutually between the FAX data allotment control means and the voice/data allotment control means for outputting allotment control data corresponding to the voice/data signal. The FAX data control signal is branched from the FAX data allotment signal reception means in the reception side and transmitted via the signal identification means in the transmission side to the FAX data allotment control means to let the FAX data allotment control means output the allotment control data according to the FAX data identification signal and the FAX data control signal.

According to other aspect of the present invention, there is provided a facsimile signal transmission system in the digital circuit multiplication equipment in which an input signal is identified to be FAX data by a signal identification means wherein a control terminal for inputting signal identification data is provided on a transmitting side and the input signal identification content in the signal identification means is capable of being changed according to the signal identification data.

According to still other aspect of the present invention, there is provided a facsimile signal transmission system in the digital circuit multiplication equipment in which an input signal is identified to be FAX data by a signal identification means wherein a control terminal for inputting a FAX data demodulation control data is provided on a transmitting side, the FAX data demodulation is controlled according to the FAX data demodulation control signal, and a remodulation process corresponding to the controlled demodulation is executed according to received FAX data allotment signal.

Other objects and features will be clarified from the following description with reference to attached drawings.

PREFERRED EMBODIMENTS OF THE INVENTION

Preferred embodiments of the present invention will now be described with reference to the drawings.

Figure 1:
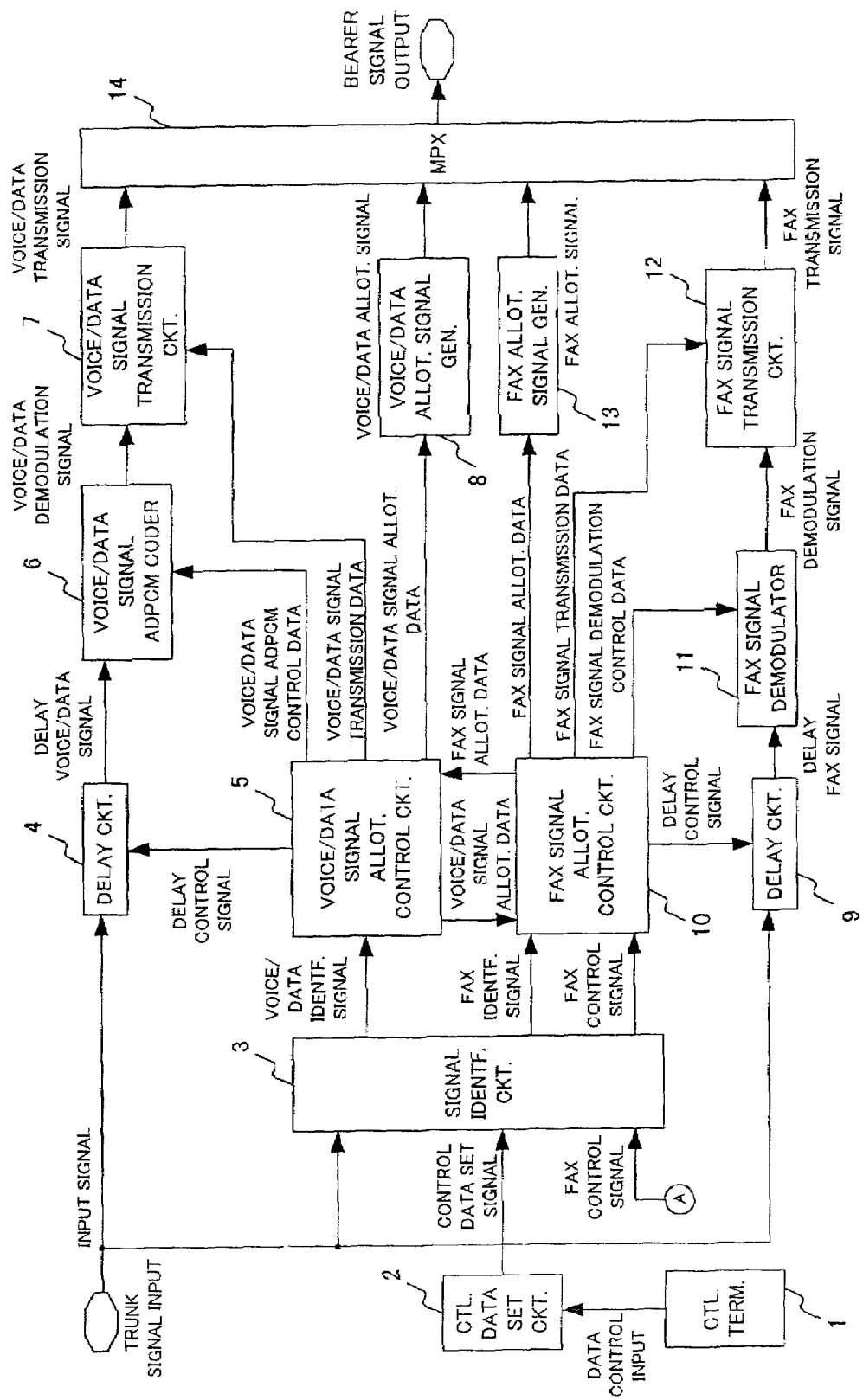
FIG. 1 is a block diagram showing the construction of the transmission side of a first embodiment of DCME according to the present invention.

Referring to FIG. 1, the transmission side of this embodiment of DCME has a general construction comprising a control terminal 1, a control data setting circuit 2, a signal identification circuit 3, a delay circuit 4, a voice/data signal allotment control circuit 5, a voice/data ADPCM coding circuit 6, a voice/data transmission circuit 7, a voice/data allotment signal generation circuit 8, a delay circuit 9, a FAX data allotment control circuit 10, a FAX data demodulation circuit 11, a FAX data transmission circuit 12, a FAX allotment signal generation circuit 13 and a multiplexing circuit 14.

Signal identification control data is inputted from the outside to the control terminal 1. The control data setting circuit 2 converts the signal identification control data inputted from the control terminal 1 to a control data setting signal. The signal identification circuit 3 identifies the input signal from the trunk signal input terminal to be a voice/data identification signal or a FAX data identification signal according to the control data setting signal from the control data setting circuit 2, and outputs either identification signal. The circuit 3 also outputs a FAX control signal transmitted from the reception side of communication via a branch A. The delay circuit 4 delays the input signal for a time necessary for the identification according to a delay control command from the voice/data signal allotment circuit, and outputs the resultant delayed voice/data signal. According to the voice/data identification signal, the voice/data signal allotment control circuit 5 outputs the delay control signal to the delay circuit 4, outputs a voice/data ADPCM coding control command to the voice/data ADPCM coding circuit 6, and outputs a voice/data signal transmission command to the voice/data transmission circuit 7. In this way, the circuit 5 effects allotment control of the above pertinent circuits. The circuit 5 also outputs a voice/data allotment command to the voice/data allotment signal generation circuit 8. In the voice/data ADPCM coding circuit 6, a pertinent ADPCM coding circuit selected according to the voice/data ADPCM coding control command from the voice/data allotment control circuit 5, executes an ADPCM coding process on the delayed voice or data signal. The voice/data transmission circuit 7 executes signal rearranging to bearer signal as voice/data ADPCM signal for transmission. The voice/data allotment signal generation circuit 8 outputs a voice/data allotment signal according to the voice/data allotment command for the notification of the voice/data allotment data to the opposite side of communication.

The delay circuit 9 delays the input signal according to the delay control signal from the FAX data allotment control circuit 10, and outputs the resultant delayed FAX data signal. According to the FAX control signal and the FAX identification signal, the FAX allotment control circuit 10 outputs a delay control signal to the delay circuit 9, outputs a FAX data demodulation control data to the FAX data demodulation circuit 11, and outputs a FAX data transmission command to the FAX data transmission circuit 12. In this way, the circuit 10 effects allotment control of the above pertinent circuits. The circuit 10 also outputs a FAX data allotment command to the FAX data allotment signal generation circuit 13. In the FAX data demodulation circuit 11, the pertinent demodulation circuit selected according to the FAX data demodulation control command from the FAX data allotment control circuit 10, executes a FAX data demodulation process, and outputs the resultant FAX data demodulation signal. The FAX data transmission circuit 12 executes rearranging to bearer signal, and outputs the resultant signal as FAX transmission signal to the multiplexing circuit 14 for the multiplexing of the FAX demodulation signal. According to the FAX data allotment command from the FAX data allotment control circuit 10, the FAX data allotment signal generation circuit 13 generates a FAX data allotment signal for the notification of the FAX data allotment data to the opposite side of communication.

The multiplication circuit 14 multiplexes the voice/data transmission signal, the voice/data allotment signal and the FAX data transmission signal, and outputs the resultant bearer signal via a bearer signal output terminal to the opposite side of communication.

The operation of the transmission side of this embodiment DCME will now be described with reference to FIG. 1.

A signal identification control signal for discriminating various FAX data control signals, such as 1,100 Hz tone signal, 2,100 Hz tone signal, a DIS signal, a DCS signal, inputted from the control terminal 1, is inputted as control input data to the control data setting circuit 2 for conversion to control data setting signal of such form as to enable comparison of the trunk input signal with analyzed data. According to the control data setting signal, the signal identification circuit 3 identifies an input signal from a switching station (not shown), as inputted from the trunk signal input terminal, and outputs a voice/data identification signal indicating that the input signal is to be processed as voice/data signal or a FAX identification signal indicating that the input signal is to be processed as FAX data signal. The circuit 3 also discriminates a FAX control signal transmitted from the reception side of communication via branch A. According to the voice/data identification signal inputted from the signal identification circuit 3, the voice/data allotment control circuit 5 outputs a delay control signal to the delay circuit 4, outputs a voice/data APDCM coding control command to the voice/data ADPCM coding circuit 6, and outputs a voice/data signal transmission command to the voice/data transmission circuit 7. In this way, the circuit 5 effects confirmation of the area capable of being used and allotment control of the above pertinent circuits for determining the actual allotment cites. The circuit 5 outputs voice/data signal allotment data as to what part of the bearer signal the ADPCM compression signal is to be allotted to. The circuit 5 further outputs a voice/data signal allotment data indicating voice/data signal allotment to the FAX data allotment control circuit 10.

Thus, according to the delay control command from the voice/data allotment control circuit 5 the delay circuit 4 delays the input voice/data signal from the trunk signal input terminal for a time necessary for the identification, and outputs the delayed voice/data signal. In the voice/data ADPCM coding circuit 6, the pertinent ADPCM coding circuit selected according to the voice/data ADPCM coding control command from the voice/data allotment control circuit 5, executes an DPCM coding process, and outputs the resultant voice/data ADPCM signal. The voice/data transmission circuit 7 executes rearranging of the video/data ADPCM signal according to the voice/data signal transmission data from the video/data allotment control circuit 5, and thus generates a voice/data transmission signal for multiplexing.

The voice/data allotment signal generation circuit 8 generates a voice/data allotment signal according to the voice/data allotment command from the video/data allotment control circuit 5 for the notification of voice/data allotment data to the opposite side of communication.

According to the voice/data allotment command from the voice/data allotment control circuit 5 and the FAX identification signal and the FAX control signal inputted from the signal identification circuit 3, the FAX data allotment control circuit 10 outputs a delay control circuit to the delay circuit 9, outputs a FAX data demodulation control command to the FAX data demodulation circuit 11, a FAX data transmission command to the FAX data transmission circuit 12. In this way, the circuit effects allotment control of the above pertinent circuits for the determination of the actual allotment cites. The circuit 10 also outputs FAX data allotment data indicating the portion of the bearer signal, which the demodulation signal is to be allotted to. The circuit 10 further outputs FAX data allotment data indicative of the FAX data allotment to the voice/data to the voice/data allotment control circuit 5.

Thus, according to the delay control signal from the FAX data allotment control signal, the delay circuit 9 delays the input FAX signal from the trunk signal input terminal for a time necessary for the identification, and outputs the resultant delayed FAX data signal. In the FAX data demodulation circuit 11, the demodulation circuit selected according to the FAX data demodulation control command from the FAX data allotment circuit 10, executes a demodulation process on the delayed FAX signal, and outputs the resultant FAX demodulation signal. According to the FAX data transmission command from the FAX data allotment control circuit 10, the FAX data demodulation circuit 12 executes rearranging to bearer, and outputs the resultant signal as FAX data transmission signal to the multiplexing circuit 14 for multiplexing. The FAX data allotment signal generation circuit 13 generates an allotment signal for modifying data of the rearranging in the FAX data transmission circuit 12 to the opposite sides of communication, and inserts this signal in a specific channel of bearer for transmission to the opposite side of communication.

The multiplexing circuit 14 multiplexes the voice/data transmission signal from the voice/data transmission circuit 7, the voice/data allotment signal from the voice/data allotment signal generation circuit 8, the FAX data transmission signal from the FAX data transmission circuit 12, and outputs the resultant bearer signal via the bearer signal output terminal to the opposite side of communication.

Figure 2:
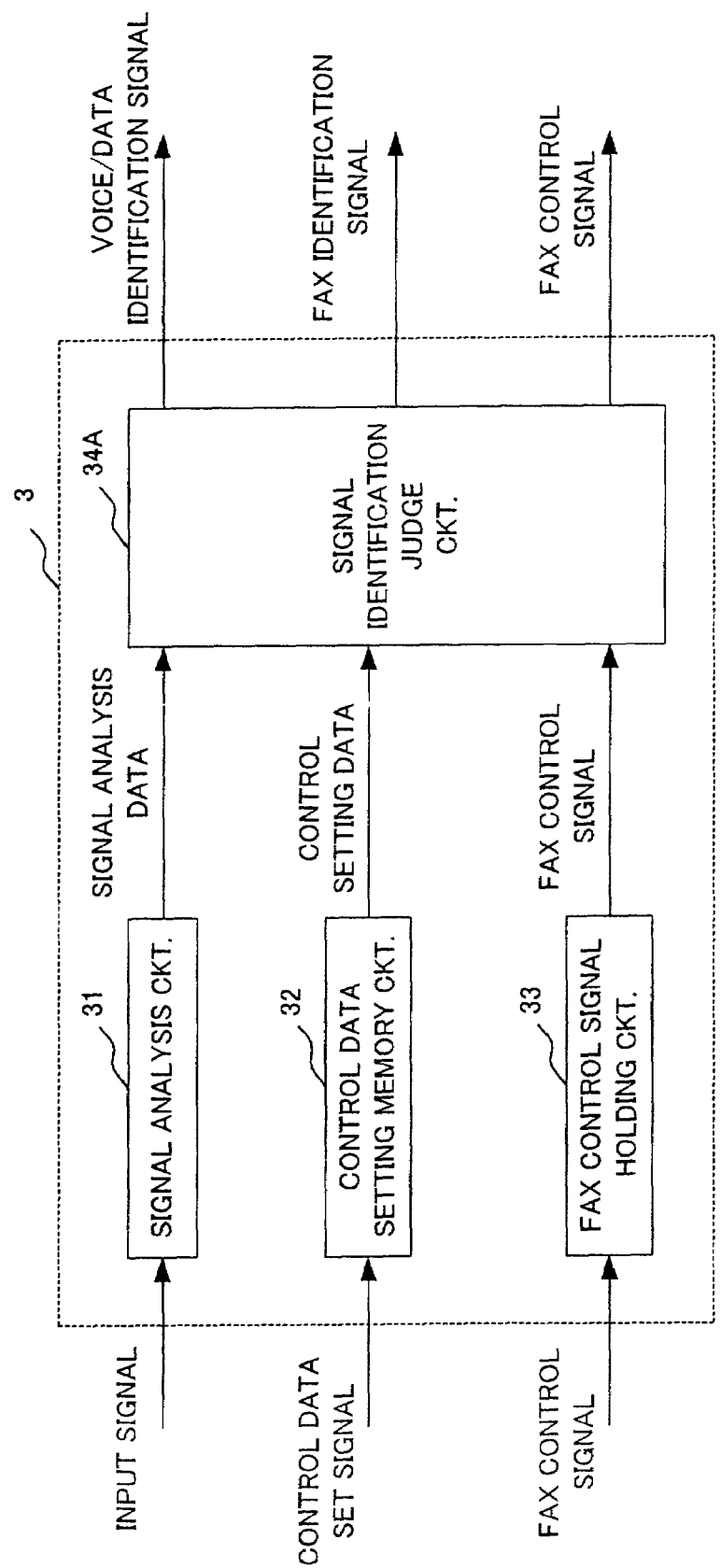
FIG. 2 is a block diagram showing a construction example of a signal identification circuit in the same embodiment.

FIG. 2 shows the signal identification circuit 3 in the transmission side of this embodiment DCME. As shown, the circuit 3 includes a signal analysis circuit 31, a control data setting memory circuit 32, a FAX control signal holding circuit 33 and a signal identification judgment circuit 34.

The signal analysis circuit 31 analyzes the input signal, and outputs resultant signal analysis data indicating 1,100 Hz tone signal, 2,100 Hz tone signal, DIS signal, DCS signal, etc. The control data setting memory circuit 32 memorizes the control data setting signal from the control data setting circuit 2, and outputs control setting data indicative of 1,100 Hz tone signal, 2,100 Hz tone signal, DIS signal, DCS signal, etc. The FAX control signal holding circuit 33 holds and outputs the FAX control signal transmitted from the FAX allotment signal reception circuit 21 on the reception side of communication. The signal identification judgment circuit 34 identifies and judges the signal analysis data, the control setting data and the FAX control signal, and outputs a FAX control signal for controlling the signal identification of FAX control codes of the DCME, such as "CONNECT" signal, "Switch-to-Demod." signal and "DISCONNECT" signal. When the circuit 34 identifies the input signal to be the voice/data signal, it outputs a voice/data identification signal. When the circuit 34 identifies the input signal to be the FAX data signal, it outputs a FAX identification signal.

Figure 3:
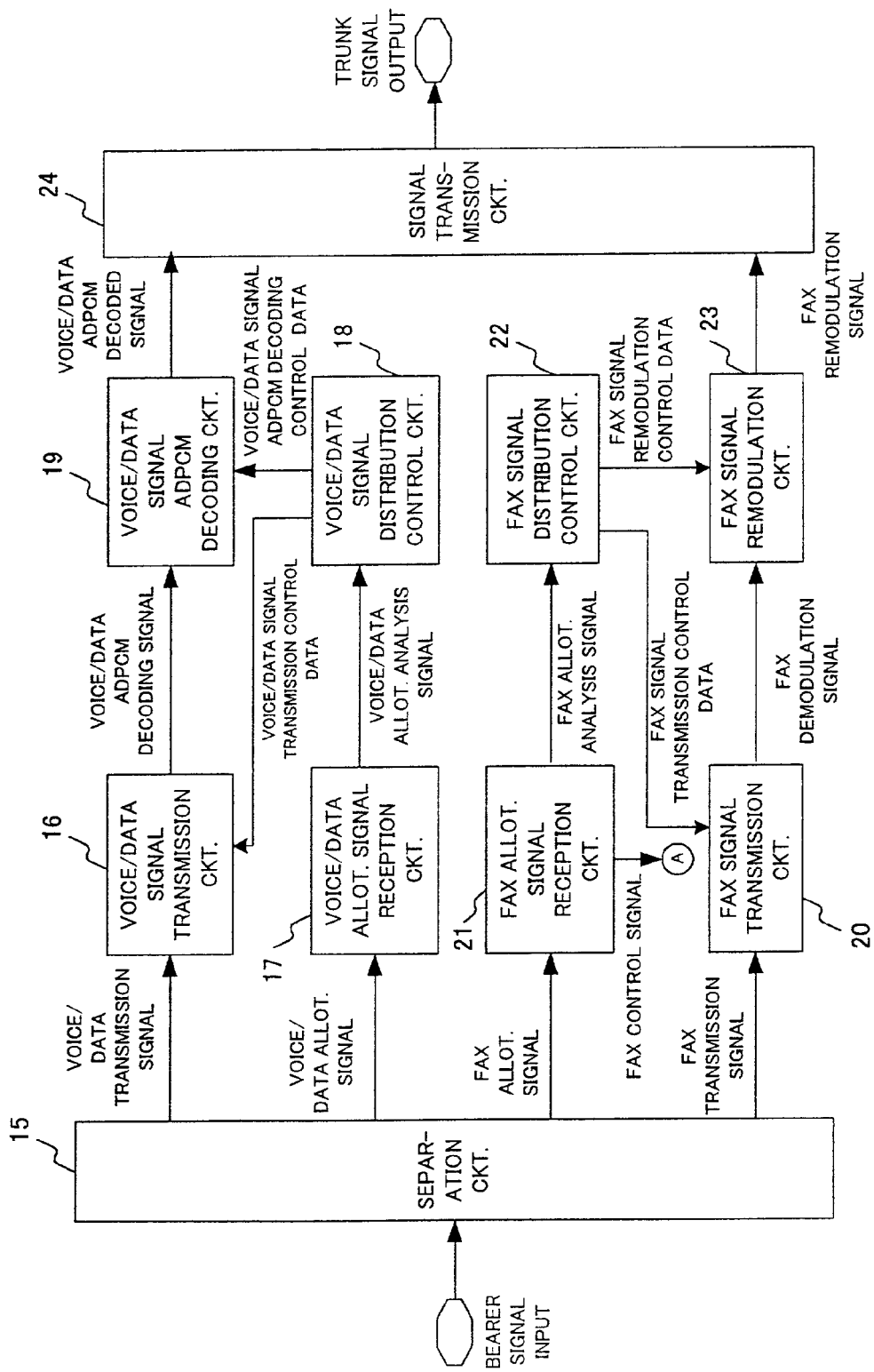
FIG. 3 is a block diagram showing the construction of the reception side of the embodiment DCME.

FIG. 3 shows the general construction of reception side of this embodiment DCME. As shown, the construction comprises a separation circuit 15, a voice/data transmission circuit 16, a voice/data allotment signal reception circuit 17, a voice/data distribution control circuit 18, a voice/data ADPCM decoding circuit 19, a FAX data transmission circuit 20, a FAX allotment signal reception circuit 21, a FAX data distribution circuit 22, a FAX data remodulation circuit 23 and a signal output circuit 24.

The separation circuit 15 separates the voice/data transmission signal, the voice/data allotment signal, the FAX transmission signal and the FAX allotment signal from the multiplexed bearer input signal. The voice/data transmission circuit 16 executes rearranging of the separated voice/data transmission signal according to the voice/data transmission control data, and outputs a voice/data ADPCM decoding signal for an APDCM decoding process. The voice/data allotment signal reception circuit 17 executes analysis of the separated voice/data allotment signal, and outputs a voice/data allotment analysis signal. The voice/data distribution control circuit 18 controls the distribution of the voice/data allotment analysis signal as voice/data transmission control command to the voice/data transmission circuit 16 and as voice/data ADPCM decoding control data to the voice/data ADPCM decoding circuit 19. According to the voice/data ADPCM decoding control signal, the voice/data ADPCM decoding circuit 19 executes an ADPCM decoding process on a pertinent signal in the voice/data ADPCM decoding signal, and outputs the voice/data AADPM decoding signal to the signal output circuit 24.

The FAX data transmission circuit 20 executes rearranging of the separated FAX transmission signal, and outputs a resultant FAX demodulation signal for remodulation. The FAX allotment signal reception circuit 21 executes analysis of the separated FAX allotment signal, and outputs a resultant FAX allotment analysis signal. The circuit 21 also outputs a FAX control signal to branch A. According to the FAX allotment analysis signal, the FAX data distribution control circuit 22 outputs a FAX data transmission control command to the FAX data transmission circuit 20 and a FAX data remodulation control command to the FAX data remodulation circuit 23. According to the FAX signal remodulation control command, the FAX data control remodulation circuit 23 executes a remodulation process on the FAX data demodulation signal, and outputs a FAX data remodulation signal.

The signal output circuit 24 outputs the voice/data APPCM decoding signal and the FAX remodulation signal to respective trunks, the signals thus being outputted as trunk signal to a trunk signal output terminal.

The operation of the reception side of this embodiment DCME will now be described with reference to FIG. 3.

The separation circuit 15 separates the voice/data transmission signal, the voice/data allotment signal, the FAX transmission signal and the FAX allotment signal from the multiplexed bearer input signal. The voice/data allotment signal reception circuit 17 executes analysis of the separated voice/data allotment signal, and outputs the voice/data allotment analysis signal. The voice/data distribution control circuit 18 distributes the voice/data allotment analysis signal as the voice/data transmission control signal and the voice/data ADPCM decoding control data. According to the data transmission control command from the voice/data distribution control circuit 18, the voice/data transmission circuit 16 executes rearranging of the separated voice/data transmission signal, and outputs the resultant ADPCM decoding signal for the ADPCM decoding process. According to the voice/data ADPCM decoding control command from the voice/data distribution control circuit 18, the voice/data ADPCM decoding circuit 19 executes the ADPCM decoding process on the pertinent signal and outputs the voice/data ADPCM decoded signal.

The FAX allotment signal reception circuit 21 executes analysis of the separated FAX allotment signal, and outputs a FAX allotment analysis signal comprising resultant allotment control data. The FAX data distribution control data 22 distributes the FAX allotment analysis signal as a FAX transmission control command as allotment control data to be outputted to the FAX data transmission circuit 20 and a FAX data remodulation control command as allotment control data to be outputted to the FAX data remodulation circuit 22. According to the FAX data remodulation control signal from the FAX data distribution control circuit 22, the FAX data transmission circuit 20 executes rearranging of the separated FAX remodulation signal, and outputs the resultant FAX demodulation signal. According to the FAX data remodulation control command from the FAX data distribution control circuit 22, the FAX data remodulation circuit 23 executes a remodulation process on the FAX demodulation signal, and outputs the resultant FAX remodulation signal. The FAX allotment data reception circuit 21 notifies the analysis result of the separated FAX allotment signal as FAX control signal via branch A to the transmission side of communication.

The signal output circuit 24 outputs the voice/data ADPCM decoded signal from the voice/data ADPCM decoding circuit 19 and the FAX remodulation signal from the FAX data remodulation 23 to the respective different trunks, these signals being outputted as trunk signal via the trunk signal output terminal to the switching station (not shown).

Figure 4:
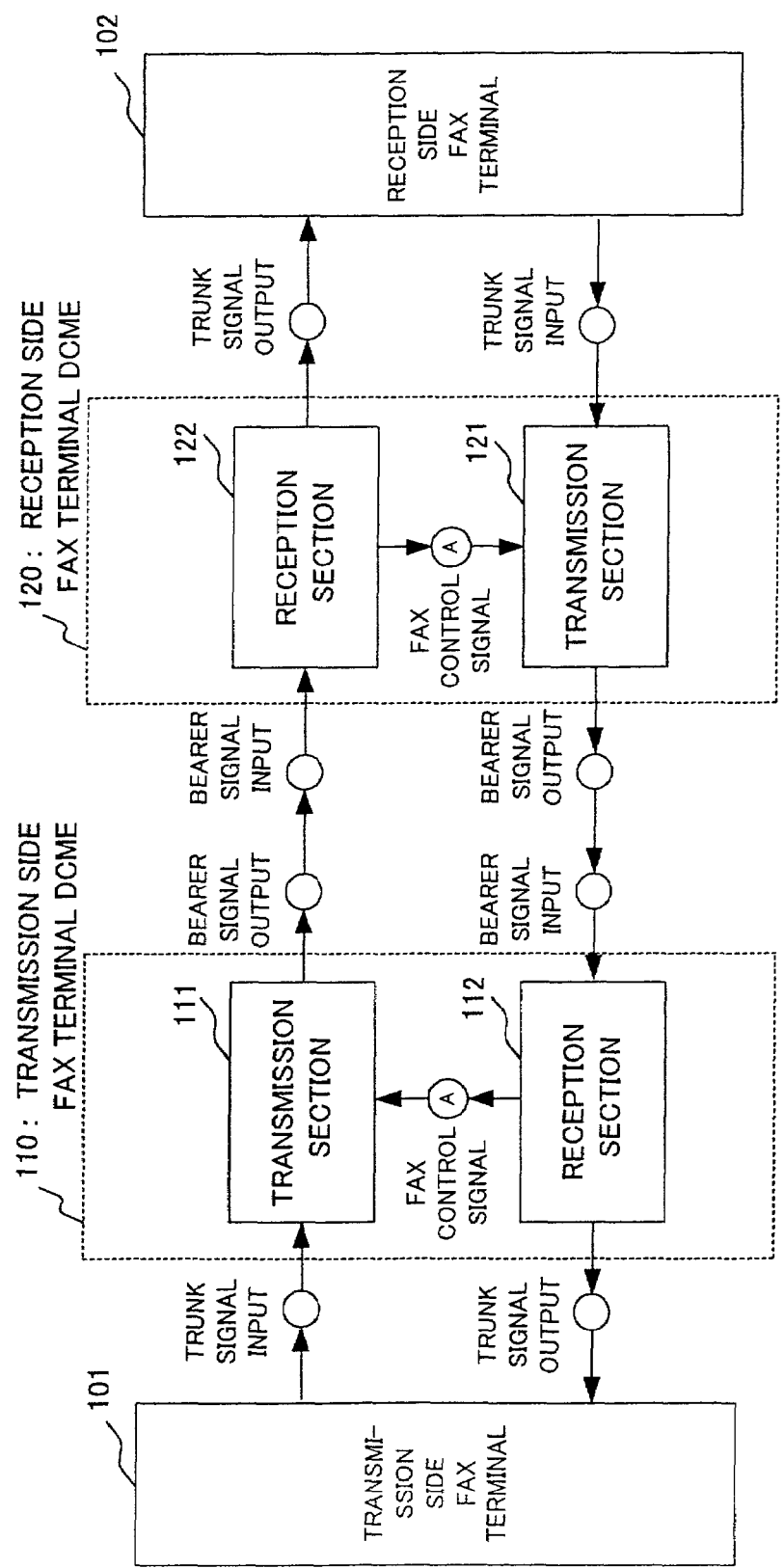
FIG. 4 is a view showing a construction example of a FAX data signal transmission system adopting the embodiment DCME.
Figure 5:
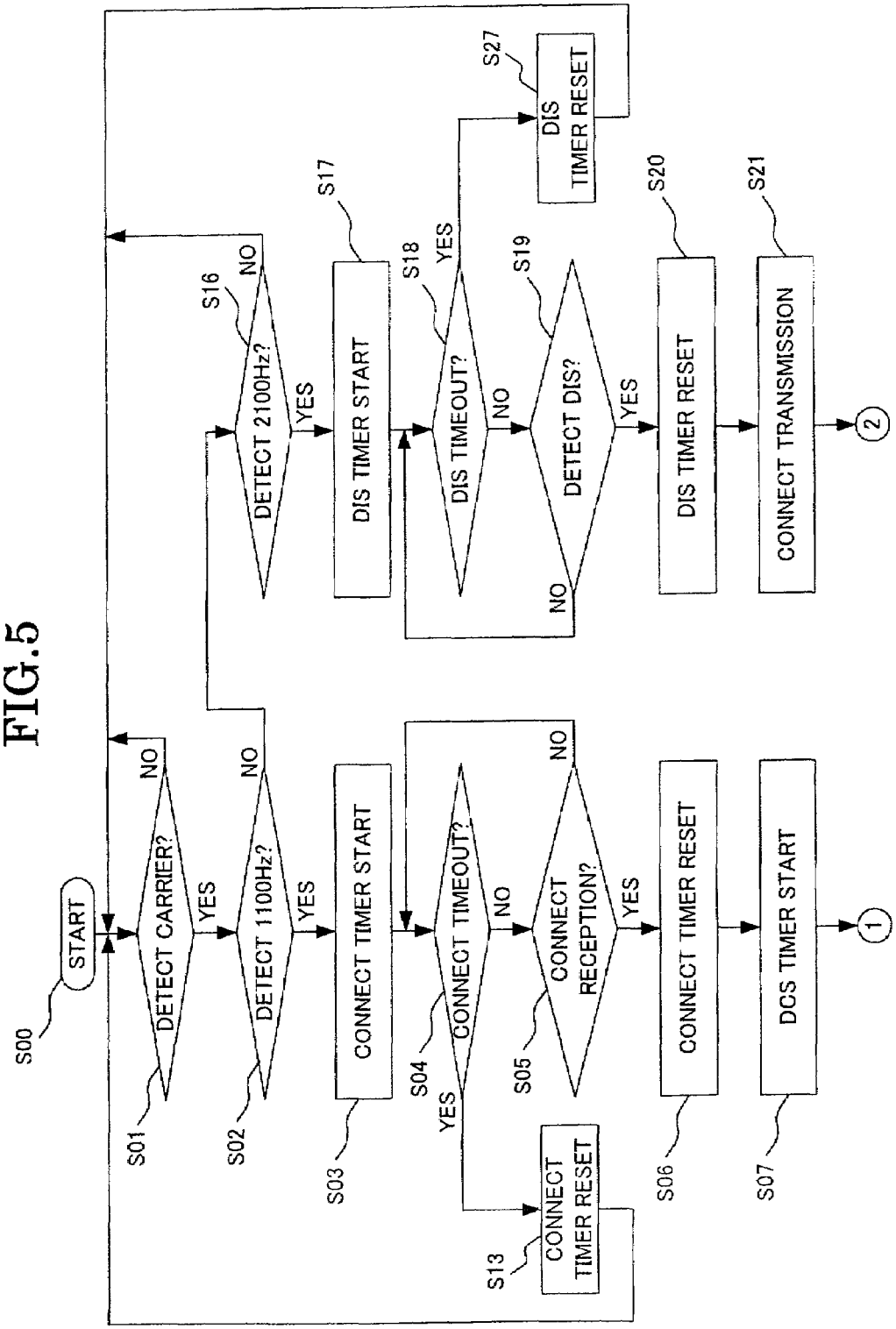
FIG. 5 is a flow chart (1) illustrating a signal identification algorithm example in the embodiment DCME.
Figure 6:
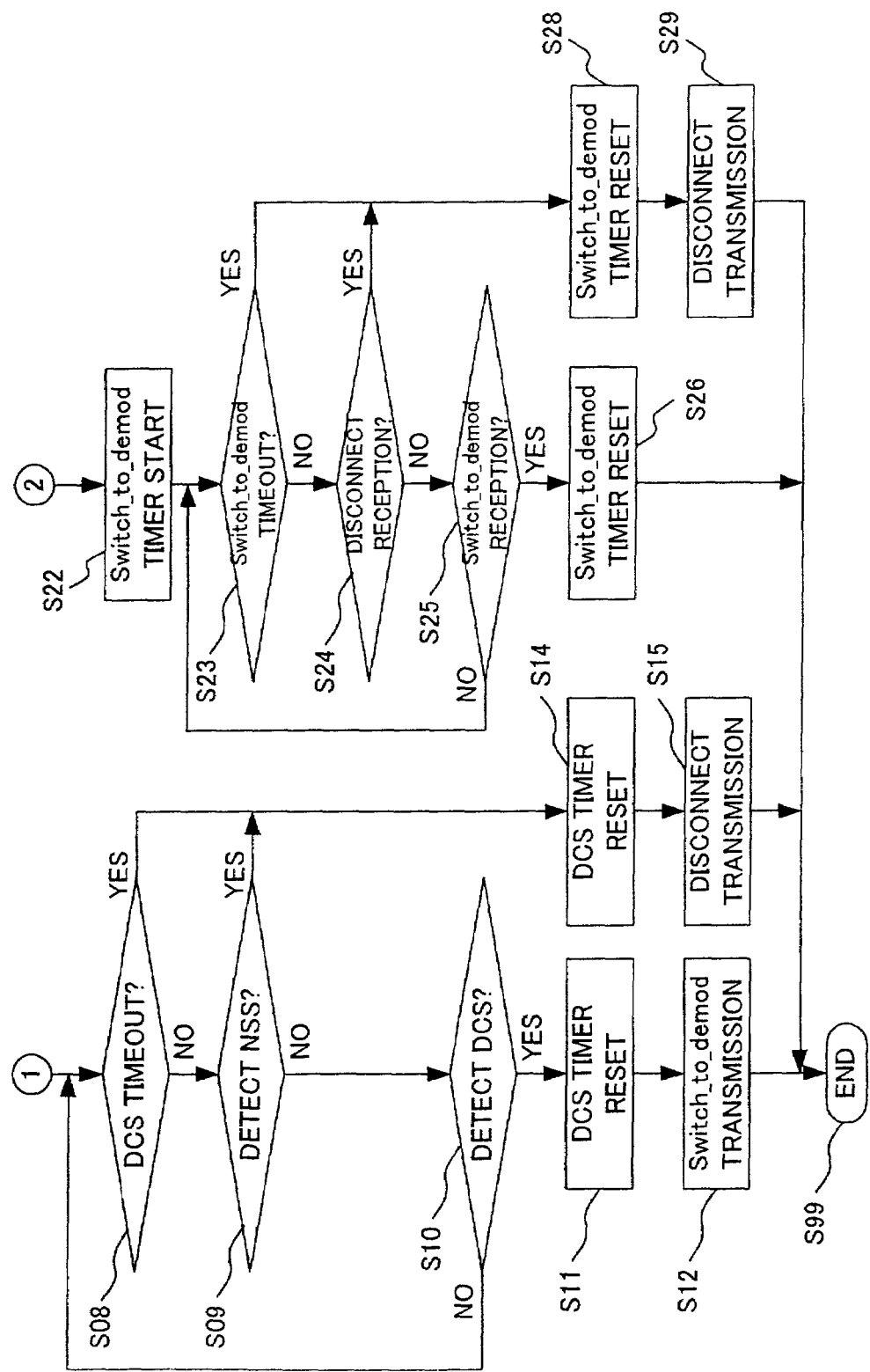
FIG. 6 is a flow chart (2) illustrating another signal identification algorithm example in the embodiment DCME.
Figure 7:
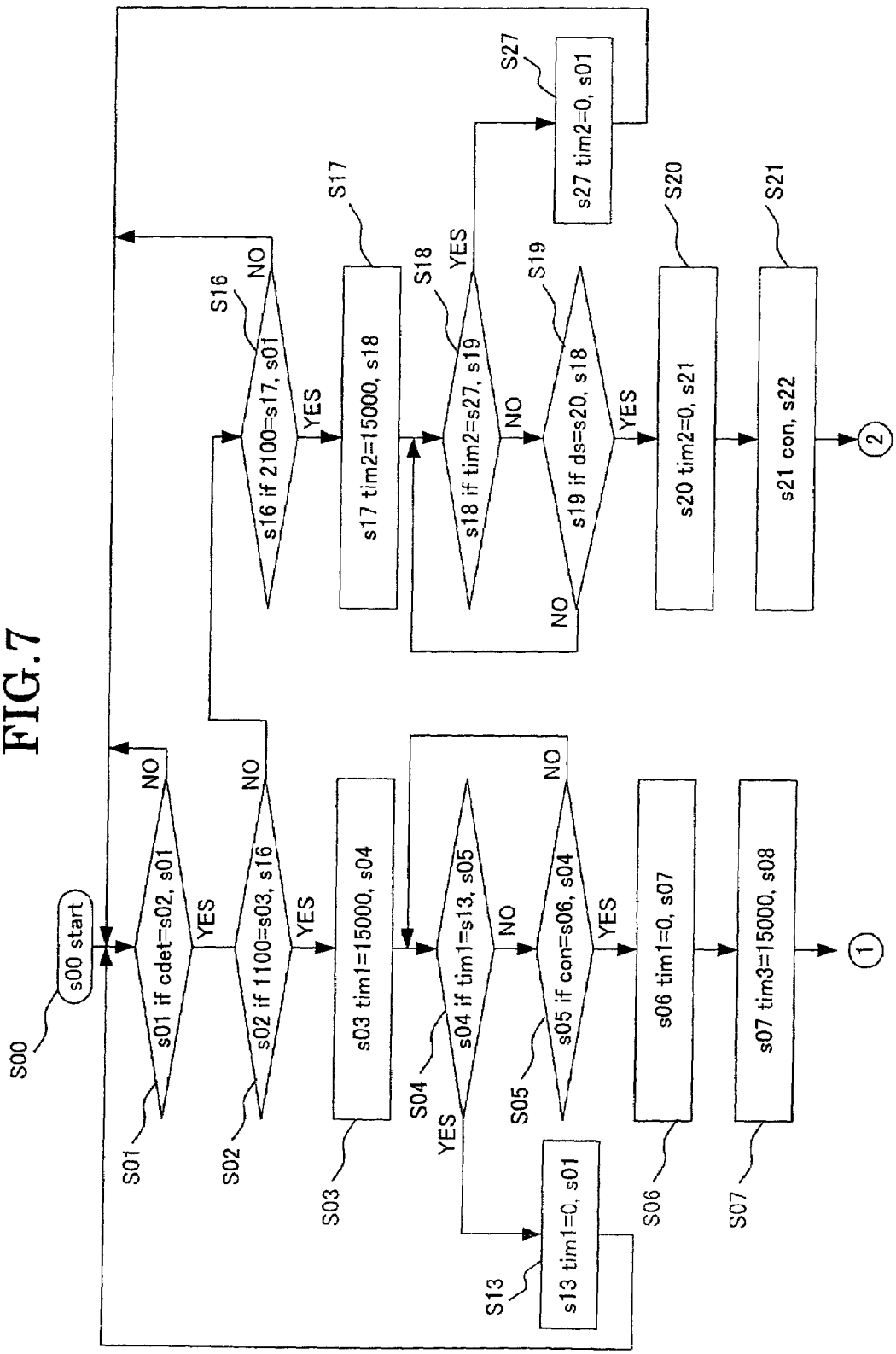
FIG. 7 is a view illustrating an example of signal input from a control terminal in the flow chart (2)
Figure 8:
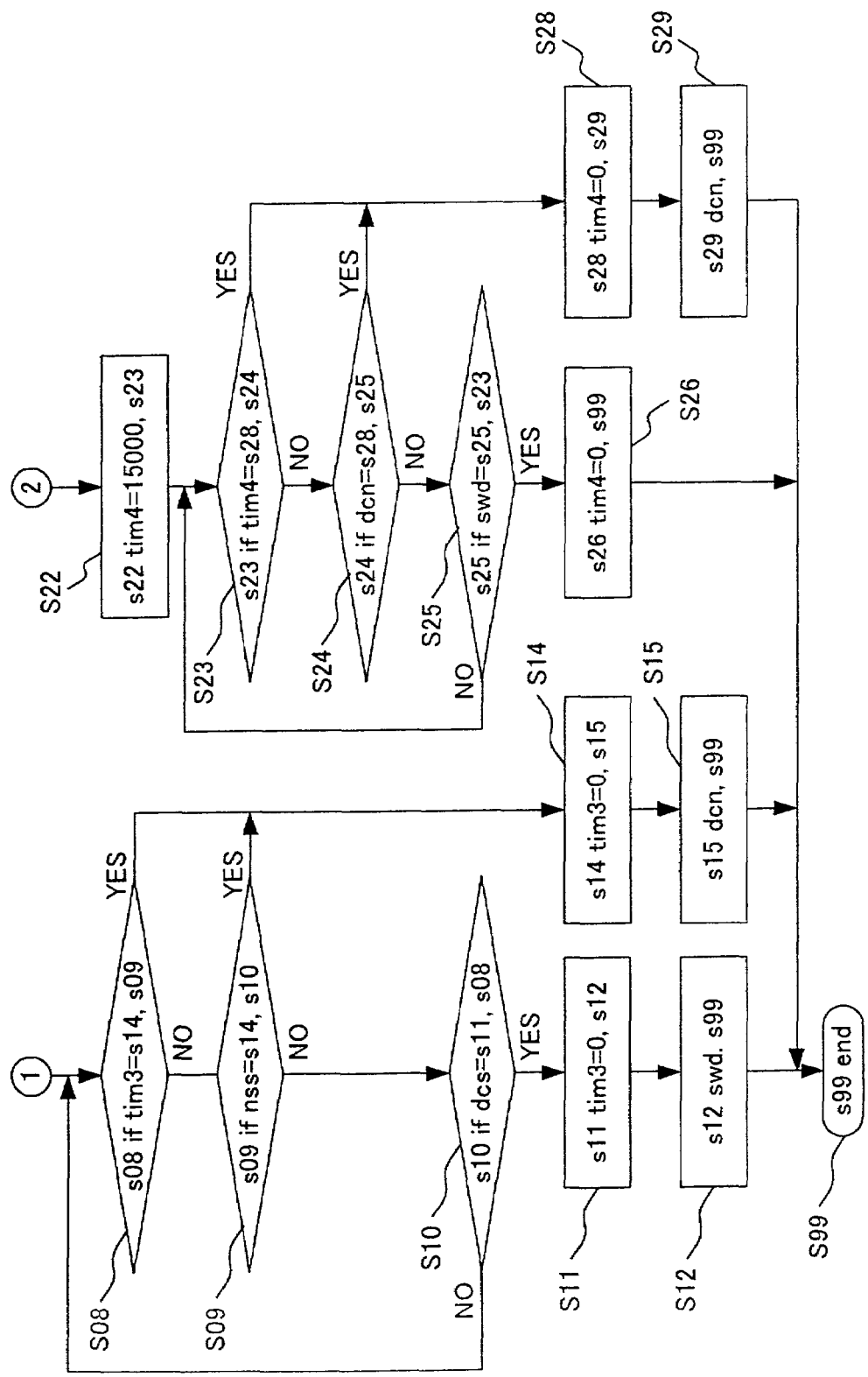
FIG. 8 is another example of signal input from the control terminal in the flow chart (2)

FIG. 4 shows a construction example of FAX signal transmission system using this embodiment of DCME. As shown, the system comprises a transmission side FAX terminal 101, a transmission side FAX terminal DCME 110, a reception side FAX terminal DCME 120 and a reception side FAX terminal 102.

In the FAX signal transmission system shown in FIG. 4, a signal from a transmission side is outputted via the transmission side FAX terminal 101 and a trunk ("TRUNK") signal input terminal to a transmission section 111 of the transmission side FAX terminal DCME 110.

The transmission section 111 of the transmission side FAX terminal DCME 110 receives the FAX control signal from a reception section 112 of the transmission side FAX terminal DCME (via branch A), and codes or decodes the input signal as the voice/data signal or a FAX data signal under control of the FAX control signal. The section 111 then executes a multiplexing process, and transmits the resultant bearer from a bearer output terminal via a satellite line, for instance, to the opposite reception side FAX terminal DCME 120.

The multiplexed signal received from the satellite line, is inputted from the bearer signal input terminal to a reception section of the reception side FAX terminal DCME 122. From the input signal, the reception section 122 separates the FAX control signal, and transmits this signal to a transmission section 21 of the transmission side FAX terminal DCME 120 (via branch A). The section 122 also executes decoding or remodulation to obtain the voice/data or FAX data signal, and transmits this signal from a trunk signal output terminal to the reception side FAX terminal 102 and thence to the reception side of communication.

The response from the reception side is transmitted via the reception side FAX terminal 102 to a trunk signal input terminal of the reception side FAX terminal DCME 120.

The transmission section 121 of the reception side FAX terminal DCME 120 receives the FAX control signal from the reception section 122 of the DCME 120, and according to this control signal it executes coding or decoding of the input signal from the reception side FAX terminal 102 as the voice/data or FAX data signal and then a multiplexing process, and transmits the resultant bearer signal from the bearer output terminal via the satellite line to the opposite reception side FAX terminal DCME 110.

The multiplexed signal received from the satellite line is inputted from the bear signal input terminal to the reception section 12 of the transmission side FAX terminal DCME 110. The reception section 112 separates the FAX control signal from the input signal, and transmits this signal to the transmission section 111 of the reception side FAX terminal DCME 110 (via branch A). The section 112 also executes decoding or remodulation to obtain the voice/data or FAX data signal, and transmits this signal from the trunk data output terminal to the transmission side FAX terminal 101 and thence to the transmission side of communication.

The signal discrimination operation of various parts in this embodiment DCME will now be described with reference to FIGS. 1 to 4.

In the transmission side of the DCME shown in FIG. 1, when the operator intends to change the control data and inputs the signal discrimination control signal from the control terminal 1, the control data setting circuit 2 converts the inputted control signal to a control data setting signal, and the content thereof is stored in the signal identification circuit 3. The FAX control signal transmitted for FAX data identification control from the FAX allotment signal reception circuit 21 in the reception side of the DCME shown in FIG. 3 via branch A, is held in the signal identification circuit 3 in the transmission side of the DCME shown in FIG. 1, and is outputted as the FAX control signal from the circuit 3. The circuit 3 identifies, according to the control data setting signal and the FAX data control signal, the input signal to be the voice/data or FAX data identification signal. Also, according to the FAX data control signal, the FAX data allotment control circuit 10 controls the FAX data allotment. The FAX data allotment command is thus fed to the FAX allotment signal generation circuit 13, and according to this command the circuit 13 transmits the FAX allotment signal as FAX data identification control data.

In the transmission side signal identification circuit 3 shown in FIG. 2, the signal analysis circuit 31 executes analysis as to whether the input signal is the voice, data, specific tone or FAX data signal, and feeds out the result as signal analysis data to the signal identification judgment circuit 34. The control data setting memory circuit 32 stores the control data inputted by the operator, and feeds out this data as control setting data to the signal identification judgment circuit 34. For the FAX data identification control, the transmission side FAX control signal holding circuit 33 holds the FAX control signal transmitted from the FAX allotment signal reception circuit 21 in the DCME transmission side, and feeds out this signal to the signal identification judgment circuit 34.

As a response to the FAX control signal from the reception side, the signal identification judgment circuit 34 transmits the FAX control data to the FAX data allotment control circuit 10. The circuit 34 also judges the signal analysis data analyzed in the signal analysis circuit 31 and the control setting data stored in the control data setting memory circuit 32. When the circuit 34 judges the input signal to be the voice/data signal, it outputs the voice/data identification signal. When the circuit 34 judges the input signal to be the FAX signal, it outputs the FAX discrimination signal.

In the reception side of the DCME shown in FIG. 3, the FAX allotment signal reception circuit 21 analyzes the FAX allotment signal received from the opposite side of communication, and outputs the result as the FAX control signal to the transmission side of the DCME shown in FIG. 1 via branch A. In this way, the FAX data identification in the transmission side of communication is controlled.

In the system construction using the DCME shown in FIG. 4, the signal outputted from the transmission side FAX terminal 101 is fed out to the transmitting section 111 in the transmission side FAX terminal DCME 110. The section 111 receives the FAX control signal from the reception section 111 via the branch A for FAX data control. The section 111 then executes coding or decoding of the voice/data or FAX data signal and then the multiplexing process, and feeds out the resultant signal to the opposite reception side FAX terminal DCME 120.

The reception section 122 in the reception side FAX terminal DCME 120 separates the FAX control signal from the multiplexed signal fed out to the reception side, and feeds out the separated signal via the branch A of the transmission section 121. The section 122 also executes decoding or remodulation of each separated signal, and feeds out the resultant signal as the voice/data or FAX data signal to the reception side FAX terminal 102.

As a response to the signal fed out to the reception side FAX terminal 102, the output signal of the reception side FAX terminal 102 is fed out to the transmission section 121 of the reception side FAX terminal DCME 120. The section 121 receives the FAX control signal from the reception section 122 via the branch, A for FAX data control. The section 121 thus executes coding or demodulation and multiplexing of the resultant voice/data or FAX data. The resultant signal is transmitted to the opposite transmission side FAX terminal DCME 110. The reception section 112 of the reception side FAX terminal DCME 110 transmits the FAX control signal via the branch A to the transmission section 111. The section 112 also executes decoding or remodulation of the multiplexed signal, and feeds out the resultant voice/data or FAX data signal to the transmission side FAX terminal 101.

Now, the flow routine of a transmission side signal identification algorithm and a corresponding specific operation example based on an example of input from the control terminal in this embodiment DCME, will now described with reference to FIGS. 5 to 8.

The flow routine as the signal discrimination algorithm example of this embodiment DCME shown in FIG. 4, comprises an input 1,100 Hz tone signal detection process, a reception process of receiving the FAX data control "CONNECT" command from the opposite side DCME, an input DCS (Digital Command Signal) signal detection process, a transmission process of transmitting the FAX control signal "Switch-to-Demod." command to the opposite side DCME executed in the transmission section 111 of the transmission side FAX terminal DCME 110 of the system construction of the DCME in FIG. 4, an input 2,100 Hz tone signal detection process, an input DIS (Digital Identification Signal) detection process, a transmission process of transmitting a FAX control signal "CONNECT" command to the opposite side DCME, and a reception process of receiving a FAX control signal "Switch-to-Demod." command from the opposite side DCME executed in the transmission section 121 of the reception side FAX terminal DCME 120.

Herein under, the 1,100 Hz tone signal may also be referred to as calling tone, and is transmitted from the calling side FAX terminal at the call time. The 2,100 Hz tone signal may also be referred to as called tone, and is transmitted from the call side FAX terminal at the answer or response time. Usually, the DIS (digital identification signal) is transmitted subsequent to the 2,100 Hz tone signal from the called side FAX terminal, and it serves to notify FAX terminal capacity data to the opposite side FAX terminal. The DCS (digital command signal) is usually transmitted as a response to the DIS from the called side FAX terminal, and it serves to notify non-standard FAX communication data selected from the received FAX terminal capacity data. The NSS (Non-Standard Signal) is a non-standard function setting signal. This signal is usually transmitted as a response to NSF (Non-Standard Facilities)/DIS from the calling side FAX terminal in order to notify the non-standard FAX data selected from the received FAX terminal capacity data. The above signals are control signals of FAX prescribed in ITU T.30.

The "Switch-to-Demod." signal is a DCME FAX control signal for switching the input FAX signal in the DCME from an ADPCM bus to a DEMOD (FAX demodulation bus). The "CONNECT" signal is a DCME FAX control signal serving, when the 2,100 Hz tone signal and the DIS signal are detected from the input signal to the DCME, such as to let the input signal to be identified as the FAX signal for the notification thereof to the opposite side DCME. The "DIS-CONNECT" is a FAX control signal of the DCME for ending the FAX data demodulation process in the DCME. The above various signals are prescribed in ITU-T G.766.

The signal analysis circuit 31 in the transmission side of the DCME shown in FIG. 1 analyzes the signal outputted from the transmission or reception side FAX terminal as to whether the signal is carrier signal, specific tone signal (1,100 Hz, 2,100 Hz, . . . ) or a specific low rate signal (DCS, DIS, . . . ), and notifies the result of analysis to the signal identification judgment circuit 34 for signal identification control.

The signal identification algorithm routine is started in step S00. As an example, the input from the control terminal 1 becomes "S00 start". When the signal analysis circuit 31 detects the carrier signal, it notifies carrier signal detection to the signal identification judgment circuit 34 (step S01). In this example, the input from the control terminal 1 becomes "S01 if cdet=02,s01". When "cdet", i.e., the carrier signal, is detected, the routine goes to step S02. When the carrier signal is not detected, the routine goes back to step S01 again.

When the carrier signal detection is notified, the signal analysis circuit 31 checks whether the carrier signal is the 1,000 Hz tone signal (step S02). In this example, the input terminal from the control terminal 1 becomes "S02 if 1,100=s03,s16". When "1,100", i.e., 1,100 Hz tone signal, is detected, the routine goes to step S03. When the 1,100 Hz tone signal is not detected, the routine goes to step S16.

When the signal analysis circuit 31 detects the 1,100 Hz tone signal, the transmission side FAX terminal 101 is connected to indicate that the signal outputted from the transmission side FAX terminal 101 has been inputted. When the circuit 31 detects the 1,100 Hz tone signal, it notifies this to the signal identification judgment circuit 34, thus bringing about a state of waiting the reception of the FAX control signal "CONNECT" command transmitted from the signal identification judgment circuit 34 in the reception side FAX terminal DCME 120, and a "CONNECT" timer is started (step S03). In this example, the input from the control terminal 1 becomes "S03 tim1=15,000,s04", "tim1", i.e., the "CONNECT" timer value, is set to 15,000 msec., the "CONNECT" timer is started, and the routine goes to step S03.

After the start of the "CONNECT" timer, a check for the time-out of the "CONNECT" timer is executed. In this example, the input from the control terminal becomes "S04 if tim1=s13,s05". At "tim1", the "CONNECT" timer time-out (15,000 msec.), the routine goes to step S13. When the "CONNECT" timer is in operation, the routine goes to step S05.

When the "CONNECT" time-out is detected, the "CONNECT" timer is reset, and the routine goes back to step S01 (step S13). In this example, the input from the control terminal 1 becomes "S13 tim1=0,s01", and after the resetting of "tim1", i.e., the "CONNECT" timer value, the routine goes to step S01.

In the transmission section 121 of the reception side FAX terminal DCME 120, the signal analysis circuit 31 detects the 2,100 Hz tone signal transmitted by the reception side FAX terminal 102 in response to the 1,100 Hz tone signal transmitted from the transmission side FAX terminal 101 (step S16). In this example, the input from the control terminal 1 becomes "S16 if 2,100=s17,s01". When "2,100", i.e., the 2,100 Hz tone signal, is detected, the routine goes to step S17. When the 2,100 Hz other signal is not detected, the routine goes back to step S01.

When the signal analysis circuit 31 detects the 2,100 Hz tone signal, the reception side FAX terminal 102 is connected, indicating the input of the signal outputted from the reception side FAX terminal 102.

When the signal analysis circuit 31 detects the 2,100 Hz tone signal, it informs this to the signal identification judgment circuit 34 to bring about the state of waiting the reception of the DIS from the reception side FAX terminal 102, and the DIS timer is started (step S17). In this example, the input from the control terminal 1 becomes "S17 tim2=15,000,s18". Thus, "tim2", i.e., DIS timer value, is set to 15,000 msec, the DIS timer is started, and the routine goes to step S18.

After the start of the DIS timer operation, the time-out of the DIS timer is checked for (step S18). In this example, the input from the control terminal 1 becomes "S18 if tim2=s27,s19". At "tim2", i.e., the time-out of the DIS timer (15,000), the routine goes to step S27. When the DIS timer is in operation, the routine goes to step S19. During the DIS timer operation, DIS judgment is executed (step S19). In this example, the input from the control terminal 1 becomes "S19 if dis=s20,s18". At the time of detection of "dis", i.e., the DIS, the routine goes to step S20. When the DIS is not detected, the routine goes to step S118.

When the signal analysis circuit 31 detects the DIS, it notifies this to the signal identification judgment circuit 34. The circuit 34 thus resets the DIS timer, and the routine goes to step S21 (step S20). In this example, the input from the control terminal 1 becomes "S20 tim2=2,s21". Thus, "tim2", i.e., DIS timer value, is reset, and the routine goes to step S21.

When the DIS timer is reset, the signal identification judgment circuit 34 transmits the FAX data control "CONNECT" command to the opposite side of communication (S21). In this example, the input from the control terminal 1 becomes "S21 con,s22". The circuit 34 thus transmits "con", i.e., the "CONNECT" command, to the opposite side of communication, and the routine goes to step S22.

When the "CONNECT" command is transmitted, the signal identification judgment circuit 34 is brought to a state of waiting the reception of the "Switch-to-Demod." command from the opposite side of communication, and the "Switch-to-Demod." timer is started (step S22). In this example, the input from the control terminal 1 becomes "S22 tim4=15,000,s23". Thus, "tim4", i.e., "Switch to Demod." timer value, is set to 15,000 msec., the "Switch to Demod." timer is started, and the routine goes to step S23.

When the time-out of the DIS timer is detected in step S18, the DIS timer is reset, and the route goes back to step S01 (step S27). In this example, the input from the control terminal 1 becomes "S27 tim2=0,s01". Thus, "tim2", i.e., the DIS timer value, is reset, and the routine goes back to step S01.

With the transmission side FAX terminal DCME 110 in the state of waiting the "CONNECT" command reception, the FAX control signal holding circuit 33 holds the "CONNECT" command received in the FAX allotment signal reception circuit 21 from the opposite side, and feeds out this signal to the signal identification judging circuit 34.

During the "CONNECT" timer operation, a check for the FAX control signal "CONNECT" command is executed (step S05). In this example, the input from the control terminal 1 becomes "S05 if con−s06,s04". At the time of the detection of "con", i.e., the "CONNECT" command, the routine goes to a step S05. When the "CONNECT" command is not detected, the routine goes back to step S04.

When the "CONNECT" command is detected, the signal identification judgment circuit 34 resets the "CONNECT" timer, and the routine goes to step S07 (step S06). In this example, the input from the control terminal 1 becomes "S06 tim1=0,s07". Thus, "tim1", i.e., the connect timer value, is reset, and the routine goes to the step S07.

When the "CONNECT" timer is reset, the signal identification judging circuit 34 is brought to the state of waiting the detection of the DSC outputted from the transmission side FAX terminal 101 in response to the 2,100 tone signal transmitted from the reception side FAX terminal 102, and the DSC timer is started (step S07). In this example, the input from the control terminal 1 becomes "S07 tim3=15,000,s08". Thus, "tim3", i.e., the DCS timer value, is set 15,000 msec, the DIS timer is started, and the routine goes to step S08.

After the start of the DCS timer, a check for the time-out of the DCS timer is executed (step S08). In this example, the input from the control terminal 1 becomes "S08 if tim3=s14,s09". At the time of "tim3", i.e., the time-out (15,000 msec) of the DCS timer, the routine goes to step S14. While the DCS timer is in operation, the routine goes to step S09.

During the operation of the DCS timer, a check is executed for the NSS (i.e., "Non-Standard Facilities Setup"), i.e., a FAX communication signal not conforming to ITU-T T.30 (step S09). In this example, the input from the control terminal 1 becomes "S09 if nss=s14,s10". At the time of the detection of "nss", i.e., the NSS signal, the routine goes to step S14. When the NSS signal is not detected, the routine goes to step S10.

At the time of the detection of the NSS signal, a check for the DCS signal is executed (step S10). In this example, the input from the control terminal 1 becomes "S1 if dcs=s11, s08". At the time of the detection of "dcs", i.e., the DSC signal, the routine goes to step S11. When the DCS signal is not detected, the routine goes back to step S08.

When the signal analysis circuit 31 detects the DCS signal, it notifies this to the signal identification judging circuit 34. The circuit 34 resets the DCS timer, and the routine goes to step S12 (step S11). In this example, the input to the control terminal 1 becomes "S11 tim=0,s12". Thus, "tim3", i.e., the DCS timer value, is reset, and the routine goes to step S12.

When the DCS timer is reset, the signal identification judging circuit 34 transmits the FAX control signal "Switch to Demod." command to the opposite side of communication (step S12). In this example, the input from the control terminal 1 becomes "S12 swd,s99". Thus, "swd:", i.e., "Switch to Demod." is transmitted to the opposite side of communication, and the routine goes to step S99.

When the "Switch to Demod." command is transmitted, the input signal is judged to be the FAX signal, the signal identification judging circuit 34 outputs the FAX identification signal to the FAX signal allotment control circuit 10, and the FAX signal demodulation control is executed.

When the DSC timer time-out is detected in step S08 or when the NSS signal is detected in step S09, the signal identification judging circuit 34 resets the DCS timer, and the routine goes to step S15 (step S14). In this example, the input to the control terminal 1 becomes "SD14 tim3=0,s15". Thus, "tim3", i.e., the DCS timer value, is reset, and the routine goes to step S15.

When the DCS timer value is reset, the signal identification judging circuit 34 transmits the FAX control signal "DISCONNECT" command to the opposite side of communication because the FAX communication signal fails to conform to ITU-T T.30 (step S15). In this example, the input from the control terminal 1 becomes "S15 den,s99". Thus, "dcn", i.e., "DISCONNECT" command is transmitted to the opposite side of communication, and the routine goes to step S99.

When the "DISCONNCT" command is transmitted, the input signal is judged to be the voice/data signal. Thus, the signal identification judging circuit 34 outputs the voice/data identification signal to the voice/data signal allotment control circuit 5, and ADPCM coding control of the voice/data signal is executed.

Meanwhile, with the reception side FAX terminal DCME 120 in the state of waiting the "Switch to Demod." reception, the FAX control signal holding circuit 33 holds the "Switch to Demod." command received in the FAX allotment signal reception circuit 21 from the opposite side of communication, and feeds out this command to the signal identification judging circuit 34.

After the start of the "Switch to Demod." timer operation, a check is executed for the time-out of the "Switch to Demod." timer (step S23). In this example, the input from the control terminal 1 becomes "S23 if tim4=s28,s24". At the time of the time-out (15,000) of "tim2", i.e., the "Switch to Demod." timer, the routine goes to step S28. While the "Switch to Demod." timer is in operation, the routine goes to step S24.

During the "Switch to Demod." timer operation, a check is executed for the reception of the FAX control signal "DISCONNECT" command (step S24). In this example, the input from the control terminal 1 becomes "S24 if dcn=s28, s25". At the time of the detection of "dcn", i.e., the "DISCOINNECT" command, the routine goes to step S28. While the "DISCONNECT" command is not detected, the routine goes to step S25.

When the "DISCONNECT" command is not detected, a check is executed for the FAX control signal "Switch to Demod." command (step S25). In this example, the input from the control terminal 1 becomes "S25 if swd=s26,s23". At the time of the detection of "swd", the "Switch to Demod." command, the routine goes to step S26. While the "Switch to Demod." command is not detected, the routine goes to step S23.

When the "Switch to Demod." is detected, the signal identification judging circuit 34 resets the "Switch to Demod." timer, and the routine goes to step S99 (step S26). In this example, the input from the control terminal 1 becomes "S26 tim4=0,s99". Thus, "tim4", i.e., "Switch to Demod." timer value is reset, and the routine goes to step S99.

When the "Switch to Demod." is reset, the input signal is identified to be the FAX data signal, and the FAX data identification signal is outputted from the signal identification judging circuit 34 to the FAX data allotment control circuit 16 for FAX data demodulation control.

When the time-out of the "Switch to Demod." is detected in step S23, or when the "DISCONNECT" command is detected in step S24, the signal identification judging circuit 34 resets the "Switch to Demod." timer, and the routine goes to step S29 (step S28). In this example, the input from the control terminal 1 becomes "S28 tim4=0,s29. Thus, "tim4", i.e., the "Switch to Demod." timer value is reset, and the routine goes to step S29.

When the "Switch to Demod." timer is reset, the signal identification judgment circuit 34 transmits the FAX control signal "DISCONNECT" command to the opposite side of communication (step S24). In this example, the input from the control terminal 1 becomes "S29 dcn,s99". Thus, "dcn", i.e., the "DISCONNECT" command is transmitted to the opposite side of communication, and the routine goes to step S99.

When the "DISCONNECT" command is transmitted, the input signal is identified to be the voice/data signal. The signal identification judging circuit 34 thus outputs the voice/data identification signal to the voice/data allotment control circuit for voice/data signal ADPCM coding control.

In this input example, when the signal identification algorithm is ended in step S99, "s99 end" is brought about.

As has been shown, in the above example of the FAX data transmission system, the transmission side of the FAX terminal DCME as a FAX module for executing a FAX compression function in the DCME, is provided with the control terminal 1 and the control data setting circuit 2. Signal identification control data is inputted from the terminal 1 to the circuit 2, which converts the input data to the control data setting signal and feeds out the signal to the signal identification circuit 3, which in turn executes a FAX signal compression and transmission process in correspondence to the control in the FAX signal allotment control circuit 10 according to the result of identification of the control, data setting signal. It is thus possible to change the control content of the circuit with respect to non-standard FAX protocol, which has heretofore been impossible. Thus, it is possible to improve the performance of identifying processable FAX signals and ensure stable FAX signal transmission.

Figure 9:
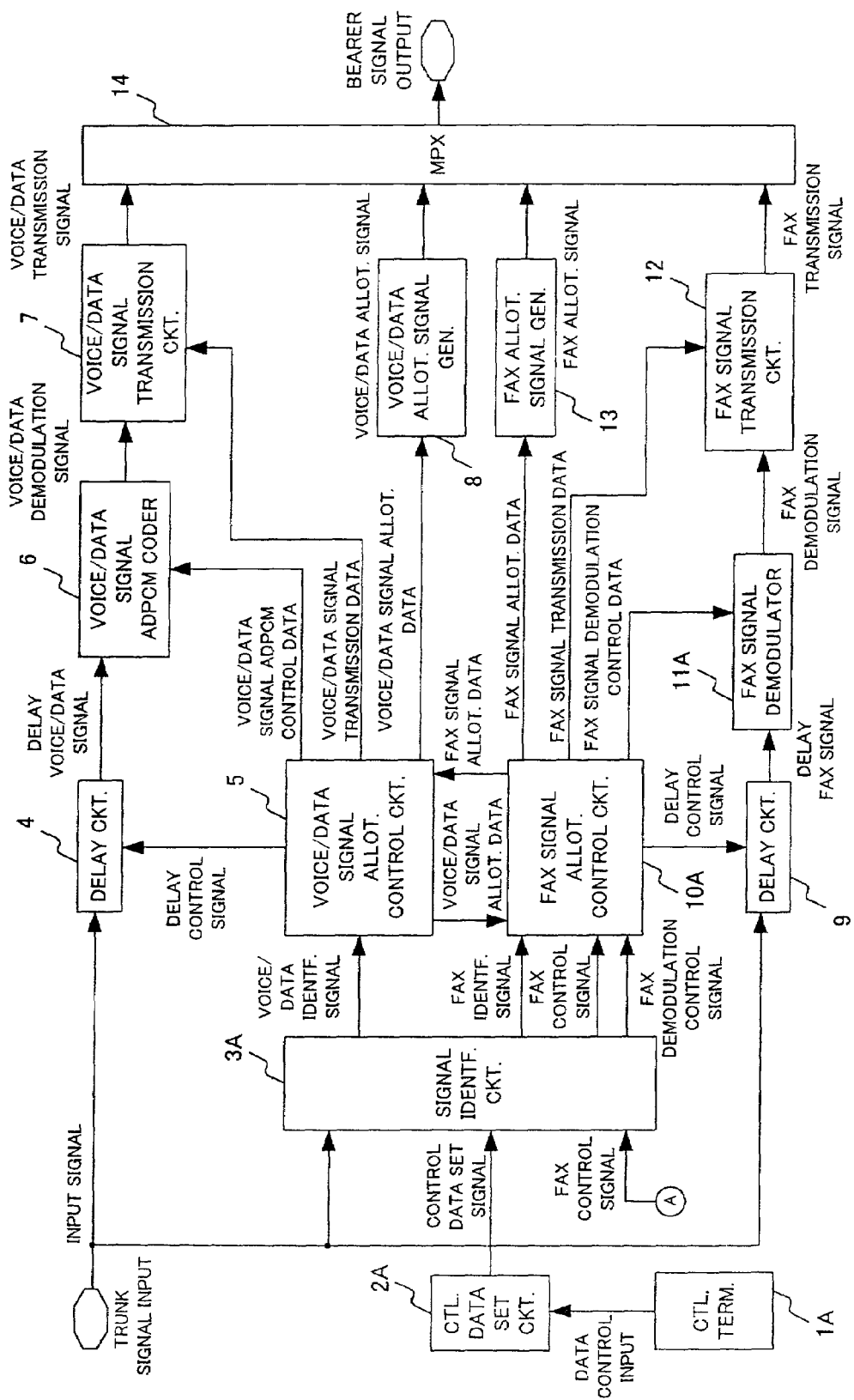
FIG. 9 is a block diagram showing the construction of the transmission side of a second embodiment of the DCME according to the present invention.
Figure 10:
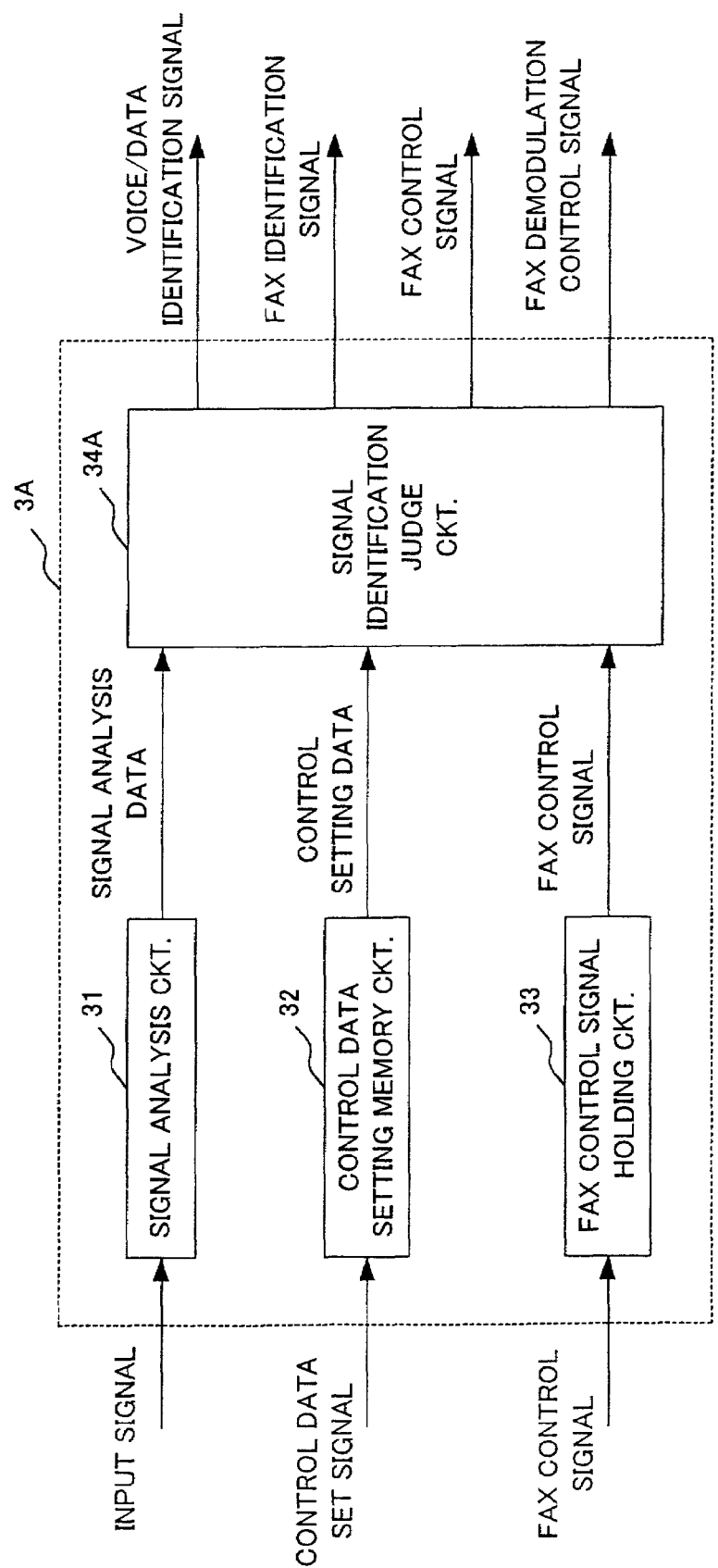
FIG. 10 is a block diagram showing a construction example of signal identification circuit in the embodiment.
Figure 11:
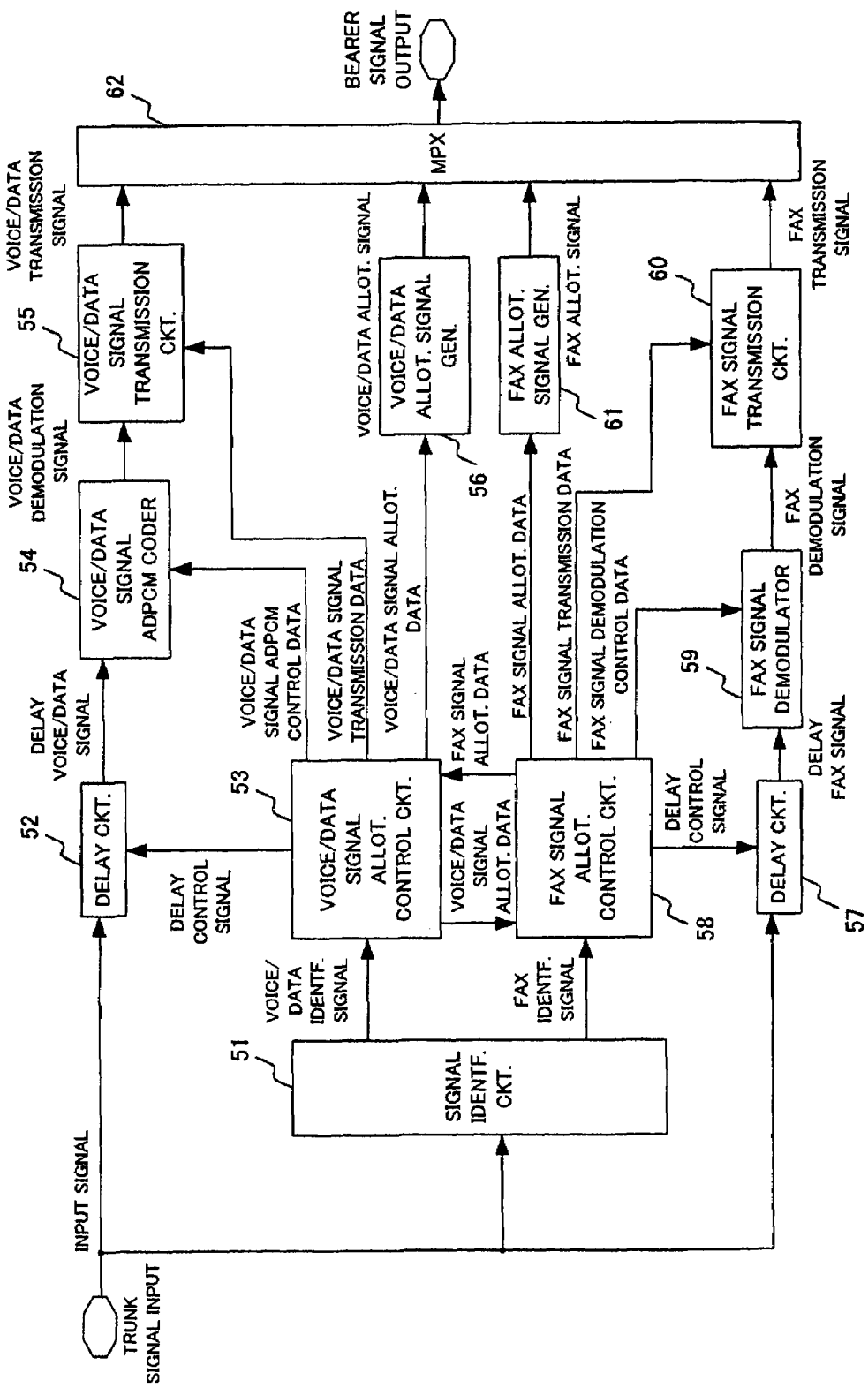
FIG. 11 shows the construction of a prior art transmission side of DCME for executing the above basic protocol.
Figure 12:
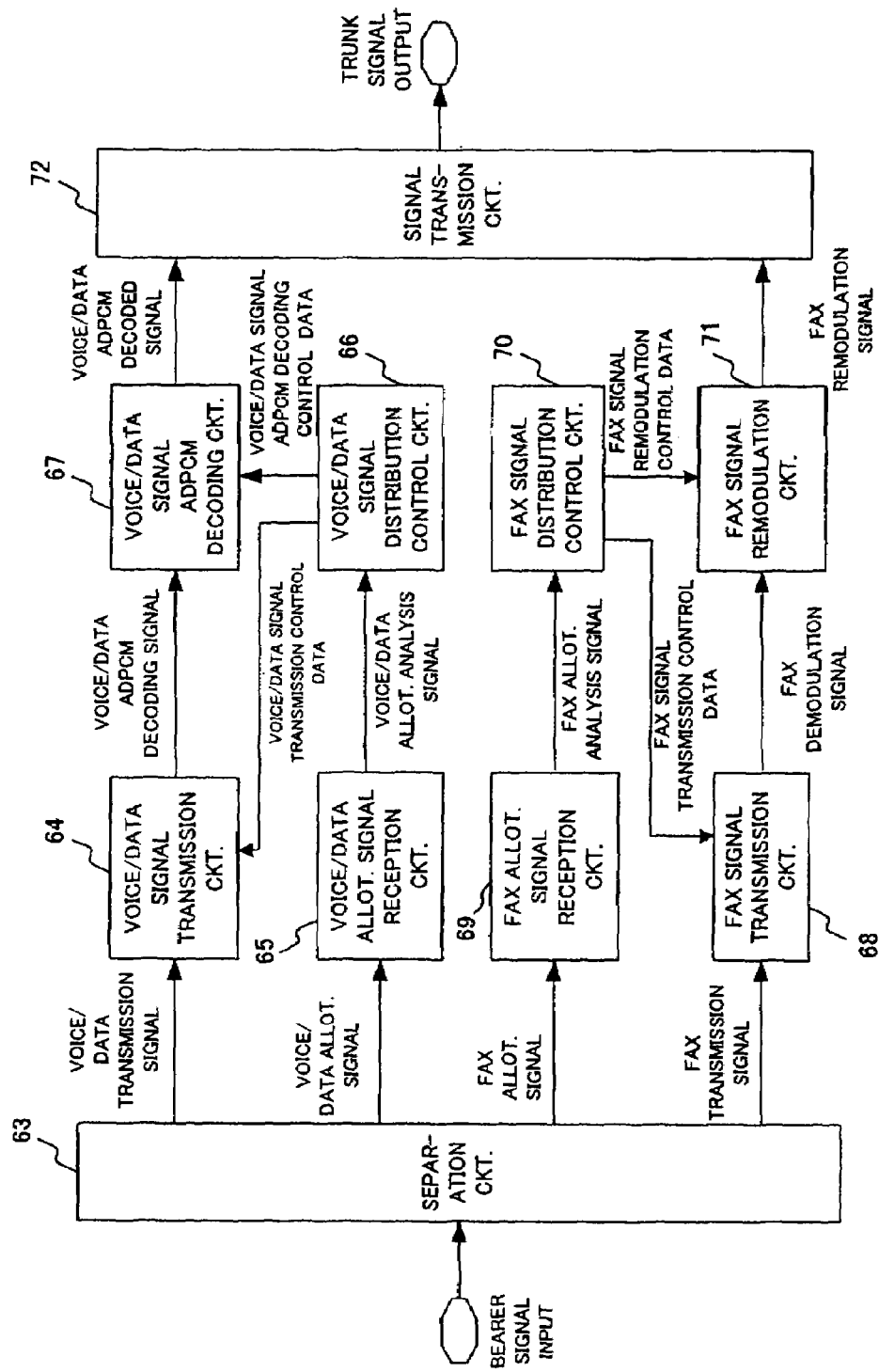
FIG. 12 shows the construction of a prior art reception side of DCME for executing the above basic protocol.

FIG. 9 is a block diagram showing the construction of the transmission side of a second embodiment of the DCME according to the present invention. FIG. 10 is a block diagram showing a construction example of signal identification circuit in the embodiment.

As shown in FIG. 9, the transmission side of this embodiment DCME has a general construction comprising a control terminal 1A, a control data setting circuit 2A, a signal identification circuit 3A, a delay circuit 4, a voice/data allotment control circuit 5, a voice/data ADPCM coding circuit 8, a voice/data transmission circuit 7, a voice/data allotment signal generation circuit 8, a delay circuit 9, a FAX data allotment control circuit 10A, a FAX data demodulation circuit 11A, a FAX data transmission circuit 12, a FAX allotment signal generation circuit 13 and a multiplexing circuit 14.

Of the above components, the delay circuit 4, the voice/data allotment control circuit 5, the voice/data ADPCM coding circuit 6, the voice/data transmission circuit 7, the voice/data allotment generation circuit 8, the delay circuit 9, the FAX data transmission circuit 12, the FAX allotment signal generation circuit 13 and the multiplexing circuit 14 are the same as those in the previous first embodiment shown in FIG. 1.

From the control terminal 1A, signal identification control data and FAX data demodulation control data are externally inputted. The control data setting circuit 2A converts the signal identification control data and the FAX data demodulation control data inputted from the control terminal 1A to control data setting signal. According to the control data setting signal inputted from the control data setting circuit 2A, the signal identification circuit 3A identifies the input signal from a trunk signal input terminal to be voice/data or FAX data identification signal, and outputs the identified signal. The circuit 2A also outputs a FAX demodulation control signal according to the FAX demodulation control data. The circuit 2A further outputs a FAX control signal transmitted from the reception side of communication via branch A. According to the FAX data control signal and the FAX data identification signal, the FAX data allotment control circuit 10A executes allotment control concerning the delay circuit 9, the FAX data demodulation circuit 11A, the FAX data transmission circuit 12 and the FAX allotment data generation circuit 13. The circuit 10A also outputs FAX data allotment data indicative of FAX data allotment to the voice/data allotment control circuit 5. In the FAX data demodulation circuit 11A, the pertinent demodulation circuit selected according to the FAX data demodulation control data from the FAX data allotment control circuit 10A, executes a FAX data demodulation process based on the FAX demodulation control data inputted from the control terminal 1A, and outputs a FAX demodulation signal.

Referring to FIG. 9, the control operation of the FAX data demodulation circuit 11 in the transmission side of this embodiment DCME will now be described. The other operation is the same as in the first embodiment shown in FIG. 1.

The control data setting circuit 2A converts the FAX demodulation control data inputted from the control terminal 1A to the FAX data demodulation signal, and transmits this signal along with the control setting signal to the signal identification circuit 3A. The signal identification circuit 3A separates the FAX data demodulation control signal from the control data setting signal, and outputs this signal. According to the FAX demodulation control signal inputted from the signal identification circuit 3A, the FAX data allotment control circuit 10A feeds out the FAX data demodulation control signal to the FAX data demodulation circuit 11A.

The FAX data demodulation circuit 11A thus can control the demodulation of the FAX data according to the FAX data demodulation control data inputted from control terminal 1A.

FIG. 10 shows the signal identification circuit 3A in the transmission section of this embodiment DCME. As shown, the circuit 3A has a general construction including a signal analysis circuit 31, a control data setting memory circuit 32, a FAX control signal holding circuit 33 and a signal identification judging circuit 34A.

Of these component, the signal analysis circuit 31, the control data setting memory circuit 32 and the FAX control signal holding circuit 33 are the same in function and operation as those in the case of the first embodiment shown in FIG. 2.

The signal identification judging circuit 34A identifies the signal analysis data, the control setting data and the FAX control signal, and outputs a FAX data control signal for signal identification control. When the circuit 34A identifies the input signal to be the voice/data signal, it outputs the voice/data identification signal. When the circuit 34A identifies the input signal to be the FAX data signal, it outputs the FAX data identification signal. The circuit 3A further separates the FAX demodulation control signal from the control setting data, and outputs this signal.

As has been shown, in this embodiment of the FAX signal transmission system, while it is possible to realize the same function and effects as the case of the first embodiment shown in FIGS. 1 to 8, it is also possible to change the demodulation control of the FAX data allotment control circuit with respect to non-standard FAX protocols. Thus, while FAX data demodulation circuit 11A controls the demodulation, the FAX data remodulation circuit can execute corresponding remodulation. Thus, it is possible to realize stable FAX data demodulation control.

In the above descriptions, the transmission and reception of the bearer signal via the satellite line are by no means limitative, and it is possible to adopt such high rate communication line as optical cables.

As has been described in the foregoing, in the FAX signal transmission system according to the present invention, the transmission side of a FAX module of DCME realizing the FAX compression function, is provided with the control terminal for inputting the signal identification control data therefrom, and the identification circuit identifies this data for the FAX signal compression and transmission process according to the allotment control data outputted from the FAX data allotment control circuit. It is thus possible to change input signal identification content in the signal identification circuit with respect to non-standard FAX protocols, which has heretofore been impossible. Thus, it is possible to improve the performance of identifying FAX signals and ensure stable FAX signal transmission.

In addition, while permitting the change of the demodulation control content from the FAX signal allotment control circuit according to the FAX demodulation control data inputted from the control terminal, the remodulation process corresponding to the demodulation control updated in the reception side of communication is made possible according to the FAX allotment signal from the FAX allotment signal generation circuit. Thus, while the FAX data demodulation processing part controls the demodulation, the FAX data remodulation processing part can execute corresponding remodulation. Thus, it is possible to realize stable FAX data demodulation/remodulation control.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A facsimile signal transmission system, in which the transmission side and the reception side are inter-coupled via a bearer for bilateral facsimile signal transmission, each side being constituted by DCME comprising:

a transmission side including a signal identification means for identifying the input signal and outputting a FAX data identification signal, a FAX data allotment control means for outputting allotment control data for a FAX data demodulation process according to the FAX data identification signal, a FAX data demodulation processing means for demodulating and rearranging the input signal according to the allotment control data and outputting a FAX data transmission signal, a FAX allotment data generation means for generating a FAX data allotment signal for notifying the allotment control data to the opposite side of communication, and a multiplexing means for multiplying the FAX data transmission signal and the FAX data allotment signal and outputting the resultant signal as a bearer signal; and a reception side including a separation means for separating the FAX data transmission signal and the FAX data allotment signal from the bearer input and outputting the separated signals, a FAX data allotment signal reception means for outputting a FAX data allotment analysis signal from the FAX data allotment signal, a FAX data distribution control means for outputting distribution control data for remodulation of FAX data, a FAX data remodulation processing means for remodulating the FAX data transmission signal according to the distribution control data and outputting a FAX data remodulation signal, a signal output means for outputting the FAX remodulation signal as trunk signal; wherein:

the transmission side is provided with a control terminal for inputting signal identification data, wherein input signal identification content in the signal identification means is capable of being changed according to the signal identification data.

2. A facsimile signal transmission system, in which the transmission side and the reception side are inter-coupled via a bearer for bilateral facsimile signal transmission, each side being constituted by DCME comprising:

a transmission side including a signal identification means for identifying the input signal and outputting a FAX data identification signal, a FAX data allotment control means for outputting allotment control data for a FAX data demodulation process according to the FAX data identification signal, a FAX data demodulation processing means for demodulating and rearranging the input signal according to the allotment control data and outputting a FAX data transmission signal, a FAX allotment data generation means for generating a FAX data allotment signal for notifying the allotment control data to the opposite side of communication, and a multiplexing means for multiplying the FAX data transmission signal and the FAX data allotment signal and outputting the resultant signal as a bearer signal; and a reception side including a separation means for separating the FAX data transmission signal and the FAX data allotment signal from the bearer input and outputting the separated signals, a FAX data allotment signal reception means for outputting a FAX data allotment analysis signal from the FAX data allotment signal, a FAX data distribution control means for outputting distribution control data for remodulation of FAX data, a FAX data remodulation processing means for remodulating the FAX data transmission signal according to the distribution control data and outputting a FAX data remodulation signal, a signal output means for outputting the FAX remodulation signal as trunk signal; wherein:

the transmission side is provided with a control terminal for inputting a FAX data demodulation control signal, wherein demodulation control content outputted from the FAX data allotment control means to the FAX data demodulation processing means is changed according to the FAX data demodulation control signal, and the FAX data remodulation processing means in the reception side can execute a remodulation process corresponding to the changed demodulation content according to the FAX allotment signal from the FAX data allotment signal generation means.

3. The facsimile signal transmission system according to claim 1, wherein the FAX data demodulation processing means includes a delay means for delaying the input signal for a time necessary for the signal identification in the signal identification means according to the allotment control data, a FAX data demodulation means for demodulating the FAX data signal with a pertinent demodulation circuit selected according to the allotment control data and outputting a FAX data demodulation signal, and a FAX data transmission means for rearranging the FAX data demodulation signal according to the allotment control data and outputting the FAX transmission signal.

4. The facsimile signal transmission system according to claim 1, wherein the FAX data remodulation processing means includes a FAX data transmission means for rearranging the FAX data transmission signal according to the distribution control data and outputting the FAX demodulation signal, and a FAX data remodulation means for remodulating the FAX data demodulation signal according to the distribution control data.

5. The facsimile signal transmission system according to claim 1, wherein the voice/data allotment data and the FAX data allotment data are transmitted mutually between the FAX data allotment control means and the voice/data allotment control means for outputting allotment control data corresponding to the voice/data signal.

6. The facsimile signal transmission system according to claim 1, wherein the FAX data control signal is branched from the FAX data allotment signal reception means in the reception side and transmitted via the signal identification means in the transmission side to the FAX data allotment control means to let the FAX data allotment control means output the allotment control data according to the FAX data identification signal and the FAX data control signal.

7. A facsimile signal transmission system in digital circuit multiplexing equipment in which an input signal is identified to be FAX data by a signal identification means wherein a control terminal for inputting signal identification data is provided on a transmitting side and wherein input signal identification content in the signal identification means is capable of being changed according to the signal identification data.

8. A facsimile signal transmission system in digital circuit multiplexing equipment in which an input signal is identified to be FAX data by a signal identification means wherein a control terminal for inputting a FAX data demodulation control signal is provided on a transmitting side, the FAX data demodulation is controlled according to the FAX data demodulation control signal, and a remodulation process corresponding to the controlled demodulation is executed according to received FAX data allotment signal.

9. The facsimile signal transmission system according to claim 2, wherein the FAX data demodulation processing means includes a delay means for delaying the input signal for a time necessary for the signal identification in the signal identification means according to the allotment control data, a FAX data demodulation means for demodulating the FAX data signal with a pertinent demodulation circuit selected according to the allotment control data and outputting a FAX data demodulation signal, and a FAX data transmission means for rearranging the FAX data demodulation signal according to the allotment control data and outputting the FAX transmission signal.

10. The facsimile signal transmission system according to claim 2, wherein the FAX data remodulation processing means includes a FAX data transmission means for rearranging the FAX data transmission signal according to the distribution control data and outputting the FAX demodulation signal, and a FAX data remodulation means for remodulating the FAX data demodulation signal according to the distribution control data.

11. The facsimile signal transmission system according to claim 2, wherein the voice/data allotment data and the FAX data allotment data are transmitted mutually between the FAX data allotment control means and the voice/data allotment control means for outputting allotment control data corresponding to the voice/data signal.

12. The facsimile signal transmission system according to claim 2, wherein the FAX data control signal is branched from the FAX data allotment signal reception means in the reception side and transmitted via the signal identification means in the transmission side to the FAX data allotment control means to let the FAX data allotment control means output the allotment control data according to the FAX data identification signal and the FAX data control signal.

* * * * *